US011919295B2

(12) United States Patent
Nakazawa

(10) Patent No.: US 11,919,295 B2
(45) Date of Patent: Mar. 5, 2024

(54) METHOD FOR CONTROLLING MEDIUM PROCESSING APPARATUS, METHOD FOR CONTROLLING RECORDING SYSTEM, POST-PROCESSING APPARATUS, AND RECORDING SYSTEM

(71) Applicant: SEIKO EPSON CORPORATION, Tokyo (JP)

(72) Inventor: Atsushi Nakazawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/045,320

(22) Filed: Oct. 10, 2022

(65) Prior Publication Data

US 2023/0057313 A1 Feb. 23, 2023

Related U.S. Application Data

(63) Continuation of application No. 16/779,856, filed on Feb. 3, 2020, now Pat. No. 11,498,347.

(30) Foreign Application Priority Data

Feb. 4, 2019 (JP) ................................ 2019-018075

(51) Int. Cl.
*B41J 2/165* (2006.01)
*B41J 13/00* (2006.01)
(Continued)

(52) U.S. Cl.
CPC ........... *B41J 13/0045* (2013.01); *B41J 2/165* (2013.01); *B41J 2/16517* (2013.01);
(Continued)

(58) Field of Classification Search
CPC ................ B41J 13/0045; B41J 2/16517; B41J 13/0036; B41J 2/1652; B41J 2/165; B41J 2/16585; B41J 2002/16573; B65H 37/04; B65H 2513/51; B65H 2301/5115; B65H 2801/24
See application file for complete search history.

(56) References Cited

U.S. PATENT DOCUMENTS 10,124,980 B2 11/2018 Okamoto
2011/0233841 A1 9/2011 Sasamoto
(Continued)

FOREIGN PATENT DOCUMENTS

JP 2002-302330 10/2002
JP 2013-210417 10/2013
(Continued)

*Primary Examiner* — Sharon Polk
(74) *Attorney, Agent, or Firm* — WORKMAN NYDEGGER

(57) ABSTRACT

A medium processing apparatus includes an intermediate stacker on which media recorded by a recording apparatus are stacked, the recording apparatus including a liquid ejection head which performs recording by ejecting liquid to media and a maintenance apparatus which performs maintenance of the liquid ejection head, and a processor which executes a process on the media received by the intermediate stacker. The medium processing apparatus executes the process after a medium which is last recorded before the maintenance is stacked on the intermediate stacker.

8 Claims, 11 Drawing Sheets

(51) Int. Cl.

| | |
|---|---|
| ***B65H 37/04*** | (2006.01) |
| ***B65H 43/06*** | (2006.01) |

(52) U.S. Cl.

CPC ......... *B41J 2/1652* (2013.01); *B41J 13/0036* (2013.01); *B65H 37/04* (2013.01); *B65H 43/06* (2013.01); *B41J 2002/16573* (2013.01); *B65H 2301/5115* (2013.01); *B65H 2513/51* (2013.01); *B65H 2801/24* (2013.01)

(56) References Cited

U.S. PATENT DOCUMENTS

| | | | | |
|---|---|---|---|---|
| 2013/0258391 | A1 | 10/2013 | Maeda | |
| 2017/0021631 | A1 | 1/2017 | Ono | |
| 2022/0234351 | A1 * | 7/2022 | Matsuo | B41J 2/04563 |

FOREIGN PATENT DOCUMENTS

| | | | | |
|---|---|---|---|---|
| JP | 2014-054819 | | | 3/2014 |
| JP | 2014054819 | A | * | 3/2014 |
| WO | 2009118915 | | | 7/2011 |

* cited by examiner

METHOD FOR CONTROLLING MEDIUM PROCESSING APPARATUS, METHOD FOR CONTROLLING RECORDING SYSTEM, POST-PROCESSING APPARATUS, AND RECORDING SYSTEM

The present application is a continuation of U.S. patent application Ser. No. 16/779,856, filed Feb. 3, 2020, which is based on, and claims priority from JP Application Serial Number 2019-018075, filed Feb. 4, 2019, the disclosures of which are hereby incorporated by reference herein in their entirety.

BACKGROUND

1. Technical Field

The present disclosure relates to, in a recording system including a recording apparatus having a liquid ejection head which ejects liquid on a medium, such as a sheet, to perform recording and a maintenance section which performs maintenance on the liquid ejection head and a medium processing apparatus having a medium stacking section on which media supplied from the recording apparatus are stacked and a processor which performs processing on media stacked on the medium stacking section, a method for controlling the medium processing apparatus that controls the process in accordance with the maintenance, a method for controlling the recording system, the medium processing apparatus, and the recording system.

2. Related Art

As an example of this type of recording system, an image processing apparatus including an image forming apparatus (an example of the recording apparatus) and a post-processing apparatus (an example of the medium processing apparatus) is disclosed in JP A-2014-54819. The image forming apparatus includes a sheet supply section, an image forming section, a maintenance section which automatically performs maintenance on the image forming section, and a controller which issues an instruction on a timing when the maintenance is to be performed to the maintenance section. Furthermore, the post-processing apparatus performs post-processing on sheets (an example of the medium) which have been subjected to the image formation and which have been successively discharged from a sheet discharge section. The controller issues an instruction for performing maintenance to the maintenance section utilizing a blank time in the post-processing operation in which a sheet which has been subjected to the image formation is not discharged from the sheet discharge section. The image processing apparatus performs the maintenance utilizing a blank time in the post-processing operation in which a sheet is not discharged from the image forming apparatus, and therefore, productivity of a recorded matter obtained by recording an image on a medium, such as a sheet, is improved.

However, in the recording system, such as the image processing apparatus, disclosed in JP A-2014-54819, the maintenance and the post-processing are simultaneously started by the recording apparatus and the post-processing apparatus, respectively, and therefore, transport of the medium which has been subjected to recording is stopped while the maintenance and the post-processing are simultaneously performed. Such stop of transport of a medium which has been subjected to recording may cause inconvenience in productivity. For example, the stop of transport of a medium which has been subjected to recording causes a temporal loss due to deceleration at a time of the stop of the medium or acceleration at a time of start after the stop, and therefore, such a loss may deteriorate productivity of the recording system. Accordingly, improvement of productivity is demanded by performing processing utilizing a blank time while stop of transport of a recorded medium which may give an adverse effect to the productivity is avoided.

SUMMARY

According to an aspect of the present disclosure, a method for controlling a medium processing apparatus includes a medium stacking section on which media recorded by a recording apparatus are stacked, the recording apparatus including a liquid ejection head which performs recording by ejecting liquid to a medium and a maintenance section which executes maintenance of the liquid ejection head, and a processor which executes a process on the media received by the medium stacking section. The method includes executing the process after a medium which is last recorded before the maintenance is performed is stacked on the medium stacking section.

According to another aspect of the present disclosure, a method for controlling a recording system includes a recording apparatus including a liquid ejection head which performs recording by ejecting liquid to a medium and a maintenance section which executes maintenance of the liquid ejection head and a medium processing apparatus including a medium stacking section on which media recorded by the recording apparatus are stacked and a processor which executes a process on the media received by the medium stacking section. The method includes executing the process after a medium which is last recorded before the maintenance is performed is stacked on the medium stacking section.

According to a further aspect of the present disclosure, a method for controlling a recording system includes a recording apparatus including a liquid ejection head which performs recording by ejecting liquid to a medium and a maintenance section which executes maintenance of the liquid ejection head and a medium processing apparatus including a medium stacking section on which media recorded by the recording apparatus are stacked and a processor which executes a process on the media received by the medium stacking section. The method includes executing the maintenance in response to termination of the recording on media included in targets of the process of one time when a processing interval time which is an interval of the process is shorter than a predetermined maintenance interval time which is an interval of execution of the maintenance.

According to a still further aspect of the present disclosure, a post-processing apparatus includes a medium stacking section on which media recorded by a recording apparatus are stacked, the recording apparatus including a liquid ejection head which performs recording by ejecting liquid to a medium and a maintenance section which executes maintenance of the liquid ejection head, a processor configured to execute a process on the media received by the medium stacking section, and a controller configured to control operation of the processor. The controller executes the process after a medium which is last recorded before the maintenance is performed is stacked on the medium stacking section.

According to a yet further aspect of the present disclosure, a recording system includes a recording apparatus including a liquid ejection head which performs recording by ejecting liquid to a medium, a maintenance section which executes maintenance of the liquid ejection head, and a controller which controls operations of the maintenance section, and a medium processing apparatus including a medium stacking section on which media recorded by the recording apparatus are stacked and a processor which executes a process on the media received by the medium stacking section. The controller executes the maintenance in response to termination of the recording on media included in targets of the process of one time when a processing interval time which is an interval of the process is shorter than a predetermined maintenance interval time which is an interval of execution of the maintenance.

DESCRIPTION OF EXEMPLARY EMBODIMENTS

A recording system including a medium processing apparatus according to an embodiment will be described hereinafter with reference to the accompanying drawings. The recording system performs a recording operation on a medium, such as a sheet, and a processing operation of performing processing on a plurality of stacked media which have been subjected to the recording operation.

Figure 1:
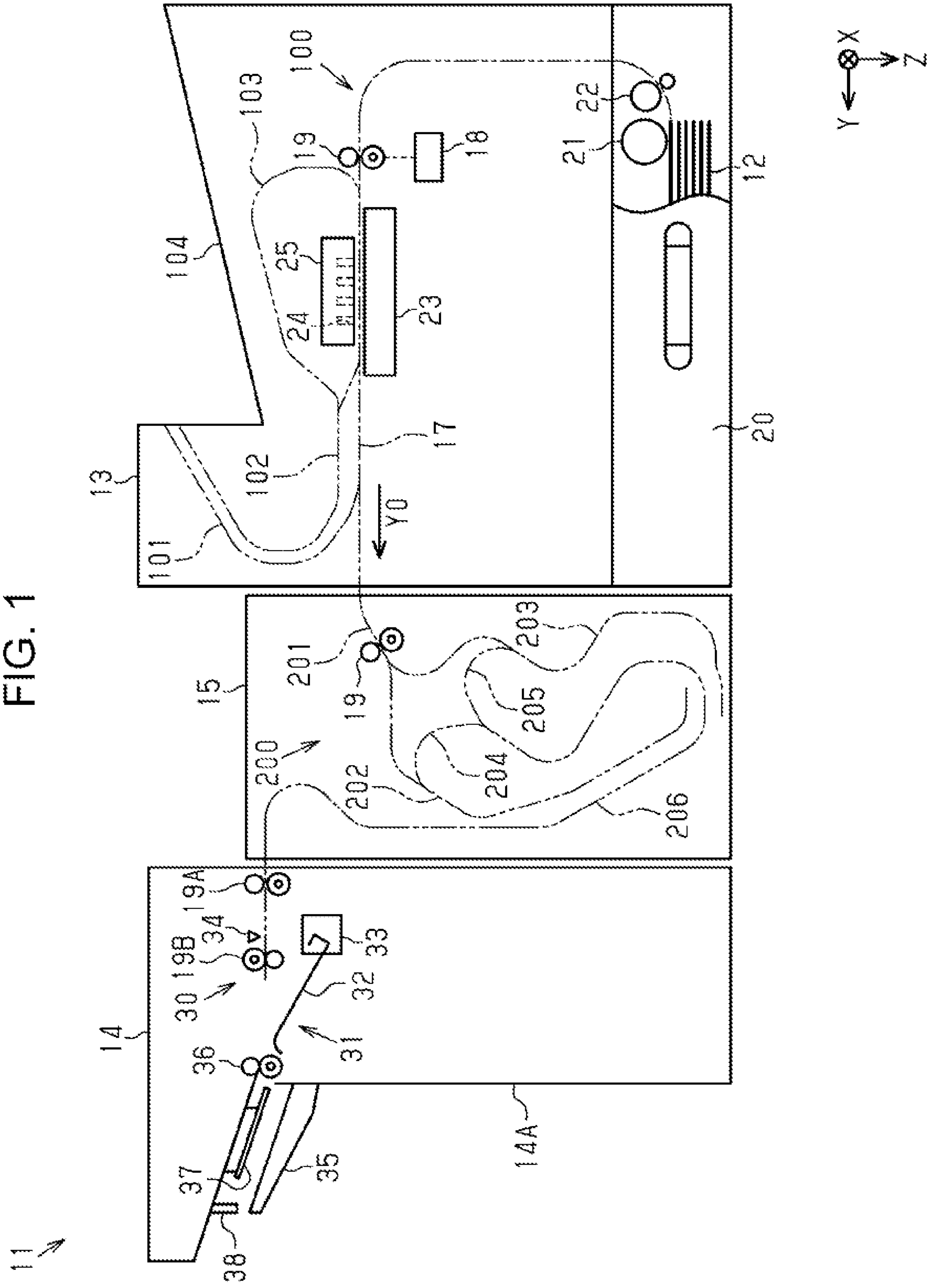
FIG. 1 is a cross-sectional view schematically illustrating a recording system including a post-processing apparatus according to an embodiment.

As illustrated in FIG. 1, a recording system 11 includes a recording apparatus 13 which performs recording on a medium 12, a post-processing apparatus 14 which performs post-processing on the recorded medium 12, and an intermediate apparatus 15 disposed between the recording apparatus 13 and the post-processing apparatus 14. The recording apparatus 13 is an ink jet printer which prints characters and images by ejecting ink which is an example of liquid to the medium 12, for example. The post-processing apparatus 14 performs a stapling process of binding a plurality of media 12 and the like as the post-processing performed on the printed media 12. The intermediate apparatus 15 reverses the recorded medium 12 which has been supplied from the recording apparatus 13 in an inside thereof, and thereafter, discharges the medium 12 to the post-processing apparatus 14. The post-processing performed by the post-processing apparatus 14 on the medium 12 may be, instead of the stapling process, a punching process, a shift process, a saddle stitching process, folding process, or the like. Here, the punching process is performed to form punched holes on the medium 12 in a unit of a predetermined number of media, and the shift process is performed to stack the media 12 on a discharge stacker 35 in an alternately shifted manner in a unit of a predetermined number of media. The term "predetermined number of media" includes a single medium or a plurality of media.

The recording system 11 further includes a transport path 17 which extends from the recording apparatus 13 through the intermediate apparatus 15 to an inside of the post-processing apparatus 14 and which is indicated by a dashed two-dotted line. Each of the recording apparatus 13 and the intermediate apparatus 15 includes at least one pair of transport rollers 19 which transports the medium 12 along the transport path 17 when a transport motor 18 is driven. Furthermore, the post-processing apparatus 14 includes a transport mechanism 30 which transports the medium 12 supplied from the intermediate apparatus 15. The transport mechanism 30 includes pairs of transport rollers 19A and 19B which transport the medium 12 to an upper portion of an intermediate stacker 32. Note that the intermediate apparatus 15 includes the transport motor 18 which drives at least one pair of transport rollers 19.

In FIG. 1, a direction of gravity of the recording system 11 in a state in which the recording system 11 is disposed on a horizontal surface corresponds to a Z axis, and two axes which orthogonal to each other along a plane which intersects with the Z axis correspond to an X axis and a Y axis. The X, Y, and Z axes are preferably orthogonal to one another. In a description below, a direction in parallel to the X axis is also referred to as a width direction X, and a direction of the gravity which is in parallel to the Z axis is also referred to as a vertical direction Z. In addition, a direction which is orthogonal to the width direction X and which extends along the transport path 17 is referred to as a first transport direction Y0. The pairs of transport rollers 19, 19A, and 19B transport the medium 12 in the first transport direction Y0 which is changed in accordance with a position of the medium 12 transported in a direction from the recording apparatus 13 to the post-processing apparatus 14.

A cassette 20 which accommodates the media 12 in a stacking state is detachably attached to the recording apparatus 13. A plurality of cassettes 20 may be attached. The recording apparatus 13 includes a pickup roller 21 which transports one of the media 12 accommodated in the cassette 20 which is disposed on a top and a separation roller 22 which separates the media 12 which are transported by the pickup roller 21 from one to another.

The recording apparatus 13 includes a support section 23 which is disposed in a position along the transport path 17 and which supports the medium 12 and a liquid ejection head 25 which is disposed in a position facing the support section 23 with the transport path 17 therebetween. The liquid ejection head 25 has nozzles 24 use to perform recording by ejecting liquid to the medium 12. The liquid ejection head 25 is a line head capable of simultaneously ejecting liquid over the medium 12 in the width direction X.

Note that the liquid ejection head 25 may be a serial head which ejects liquid while being moved in the width direction X.

The recording apparatus 13 includes a discharge path 101 which discharges the medium 12, a switch-back path 102 which transports the medium 12 in a switch-back manner, and a reverse path 103 in which an orientation of the medium 12 is reversed, as portions of the transport path 17. The medium 12 which has been subjected to recording by the liquid ejection head 25 is discharged through the discharge path 101 to a discharge section 104.

When both-side printing is performed, the medium 12 having a printed side surface is transported to the switch-back path 102 and further transported in a reversed direction from the switch-back path 102 to the reverse path 103. The medium 12 reversed in the reverse path 103 is supplied to the liquid ejection head 25 again, and the liquid ejection head 25 performs printing on a surface opposite to the printed surface. In this way, the recording apparatus 13 performs the both-side printing on the medium 12. The recording apparatus 13 transports the printed medium 12 to the discharge section 104 or the intermediate apparatus 15.

The intermediate apparatus 15 includes a reverse processing section 200 which reverses the printed medium 12 supplied from the recording apparatus 13 and discharges the medium 12 to the post-processing apparatus 14. The reverse processing section 200 includes an input path 201, a first switch-back path 202, a second switch-back path 203, a first joining path 204, a second joining path 205, and an output path 206 as portions of the transport path 17. Furthermore, the reverse processing section 200 includes a plurality of pairs of transport rollers 19 (only one of the pairs of transport rollers 19 is illustrated) which are used to transport the medium 12 along the paths 201 to 206 and flaps, not illustrated, which guide the medium 12 to one of transport destinations in branching portions of the paths 201 to 203. The transport destinations, that is, the first switch-back path 202 and the second switch-back path 203, of the medium 12 supplied from the input path 201 are switched from one to another by a corresponding one of the flaps.

The medium 12 which is transported to the first switch-back path 202 is switched back in the first switch-back path 202 and reversed in the first joining path 204 before being transported to the output path 206. On the other hand, the medium 12 transported from the input path 201 to the second switch-back path 203 is switched back in the second switch-back path 203 and reversed in the second joining path 205 before being transported to the output path 206. By this, the medium 12 is output to the post-processing apparatus 14 from the intermediate apparatus 15 through the output path 206 such that one of the surfaces of the medium 12 which has been subjected to printing performed by the recording apparatus 13 immediately before the output faces downward. Furthermore, since the medium 12 is transported in the intermediate apparatus 15, a drying time is ensured, and therefore, curl of the medium 12 caused by moisture of liquid attached to the medium 12 may be suppressed.

Next, an embodiment of the post-processing apparatus 14 will be described.

As illustrated in FIG. 1, the post-processing apparatus 14 includes the transport mechanism 30 described above which supplies the medium 12 which has been subjected to the reverse processing performed by the reverse processing section 200 and discharged from the reverse processing section 200 to an inside of a case 14A and which transports the supplied medium 12. The post-processing apparatus 14 further includes a medium processing apparatus 31 having the intermediate stacker 32 which is an example of a medium stacking section on which the media 12 which have been subjected to the recording performed by the recording apparatus 13 are stacked and a post-processing mechanism 33 which is included in a processor which performs the post-processing as an example of the processing on the media 12 which are received by the intermediate stacker 32. The medium processing apparatus 31 aligns the media 12 supplied from the transport mechanism 30 and received by the intermediate stacker 32 and performs the post-processing on the stacked media 12 where appropriate. The intermediate stacker 32 receives the recorded media 12 supplied from the recording apparatus 13. Furthermore, in this example, the media 12 which are received by the intermediate stacker 32 have been subjected to recording performed by the liquid ejection head 25 before reaching the medium processing apparatus 31.

The transport mechanism 30 includes the pair of transport rollers 19A for supplying the medium 12 discharged from the intermediate apparatus 15 and the pair of transport rollers 19B for discharging the supplied medium 12 to the medium processing apparatus 31. A sensor 34 which detects the medium 12 transported by the transport mechanism 30 is disposed in a position in the vicinity of the transport mechanism 30.

Furthermore, as illustrated in FIG. 1, the post-processing apparatus 14 includes the discharge stacker 35 on which the media 12 discharged from the intermediate stacker 32 are stacked. The discharge stacker 35 outwardly extends from a side surface of the case 14A of the post-processing apparatus 14. The discharge stacker 35 is capable of being moved upward and downward along the side surface of the case 14A. The discharge stacker 35 moves downward as a stacking amount of the media 12 is increased so as to receive the media 12 discharged from the medium processing apparatus 31 based on a result of detection performed by a detection section, not illustrated, which detects a height of the stacked media 12.

As illustrated in FIG. 1, the medium processing apparatus 31 includes a discharge mechanism 36 included in the processor which performs a discharge operation of discharging the medium 12 to the discharge stacker 35 as an example of processing performed on the media 12 received by the intermediate stacker 32. The discharge mechanism 36 of this embodiment employs a roller transport method using a pair of transport rollers. Note that, instead of the roller transport method, the discharge mechanism 36 may employ a push method using a pusher, not illustrated, to discharge the media 12 on the intermediate stacker 32 to the discharge stacker 35 by pushing the media 12 from the intermediate stacker 32.

Furthermore, the medium processing apparatus 31 includes a medium support member 37 which supports a leading end portion of the medium 12 received by the intermediate stacker 32 in a discharge direction and a first aligning member 38 which performs an aligning operation of aligning ends of the plurality of media 12 received by the intermediate stacker 32. The medium support member 37 is positioned vertically over the discharge stacker 35 and has a function of temporarily supporting the media 12 discharged from the intermediate stacker 32.

Figure 2:
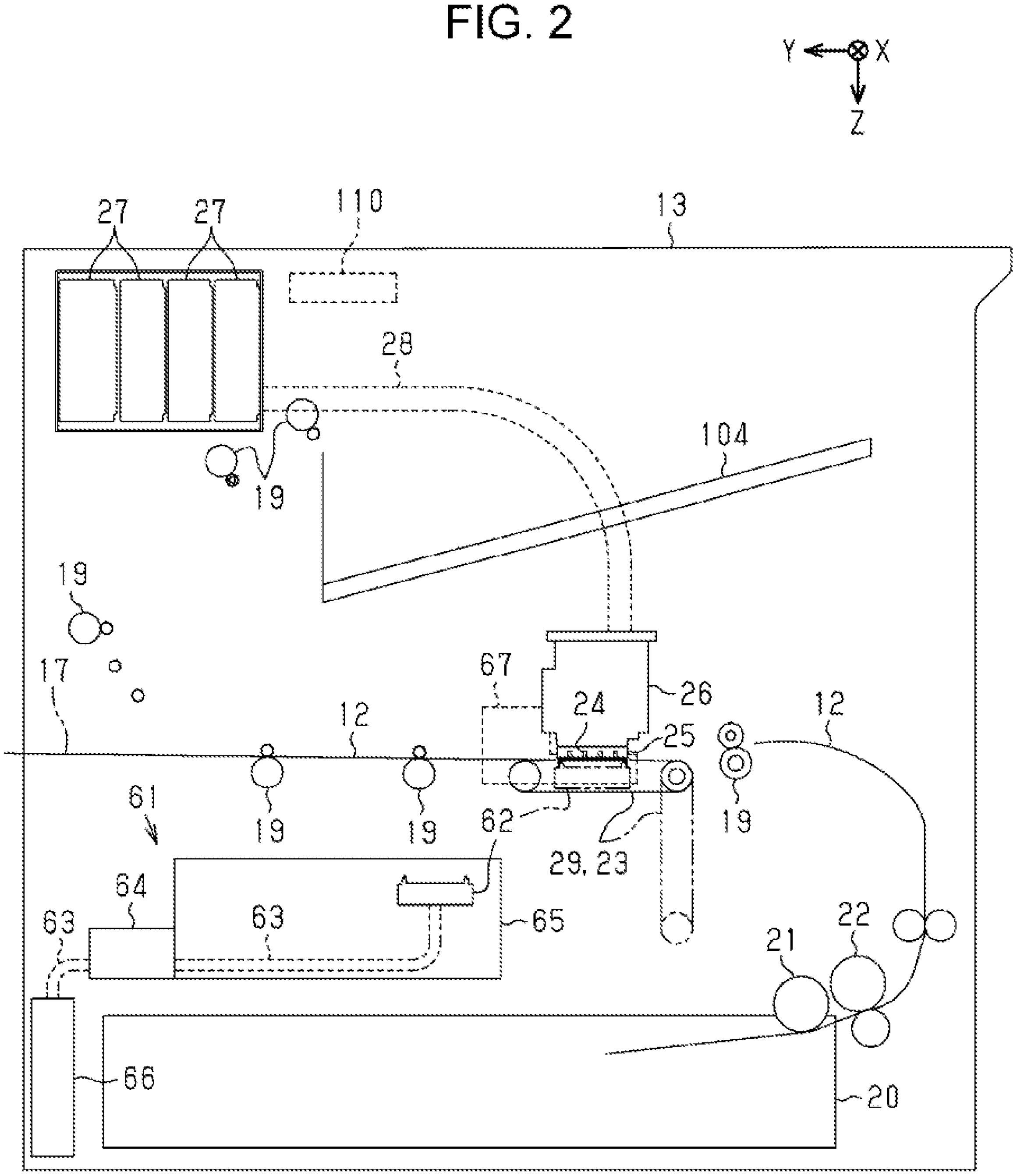
FIG. 2 is a cross-sectional view schematically illustrating a configuration of a recording apparatus.

Next, a configuration of the recording apparatus 13 will be described in detail with reference to FIG. 2. As illustrated in FIG. 2, the recording apparatus 13 includes the liquid ejection head 25 including the nozzles 24 which eject liquid, a holding section 26 which holds the liquid ejection head 25, and a supply path 28 which supplies liquid accommodated in liquid accommodation bodies 27 to the liquid ejection head 25. The liquid ejection head 25 of this embodiment is the line head described above which performs printing in a range spreading over the width of the medium 12. Furthermore, a position where the liquid ejection head 25 ejects liquid in the transport path 17 is referred to as a recording position.

In this embodiment, the support section 23 includes a transport belt 29 which supports the medium 12 in the recording position. The transport belt 29 transports the medium 12 in a predetermined transport speed while supporting the medium 12 in the recording position. The transport belt 29 is retracted to a retracting position denoted by a dashed two-dotted line in FIG. 2 from a support position denoted by a solid line in FIG. 2 when maintenance is performed on the liquid ejection head 25. Specifically, the transport belt 29 pivots using an upstream end portion thereof in the first transport direction Y0 at the center, supports the medium 12 in the recording position which faces the liquid ejection head 25, and is retracted to a position which does not face the liquid ejection head 25 in the retracting position.

The recording apparatus 13 includes a maintenance apparatus 61 as an example of the maintenance section which performs maintenance on the liquid ejection head 25. The maintenance apparatus 61 includes a cap 62, a waste liquid path 63 coupled to the cap 62, a suction pump 64 disposed in a portion of the waste liquid path 63, a movement mechanism 65 which moves the cap 62, and a wiping apparatus 67 which wipes the liquid ejection head 25. Then, in the recording apparatus 13, the maintenance apparatus 61 performs a maintenance operation, such as flushing for discharging liquid which does not relate to the recording from the nozzles 24 or cleaning for forcibly discharging liquid from the nozzles 24 so that ejection failure of the liquid ejection head 25 is suppressed or reduced.

In the movement mechanism 65, the cap 62 is moved in a range between the retracting position indicated by a solid line in FIG. 2 and a capping position indicated by a dashed two-dotted line in FIG. 2 which is adjacent to the liquid ejection head 25. The cap 62 enters a capping state when being moved in the capping position. In the capping state, the cap 62 forms a closed space in which the nozzles 24 are closed. When the liquid ejection head 25 does not discharge liquid, the capping is performed so that the nozzles 24 are hardly dried. In this way, ejection failure is suppressed.

Furthermore, the recording apparatus 13 retracts the support section 23 from the support position to the retracting position at a predetermined timing during the recording, and moves the cap 62 from the retracting position to the capping position before performing the flushing for ejecting liquid which does not relate to the recording from the nozzles 24 of the liquid ejection head 25 toward the cap 62. Here, the predetermined timing corresponding to a timing when a predetermined flushing interval time elapsed after a preceding flushing operation.

Here, the liquid ejection head 25 has a predetermined number of nozzles 24 in a range from 100 nozzles to several tens of thousands of nozzles for different liquid types, such as different ink colors, and viscosity of the ink in the nozzles 24 which are not used, that is, which do not eject liquid, during the recording is gradually increased. When the flushing is performed, the viscous ink included in the nozzles 24 is discharged so that clogging of the nozzles 24 is suppressed. During the maintenance, the recording may not be performed since the support section 23 is retracted, and therefore, the maintenance is performed at a timing between the media 12, that is, between pages. The recording apparatus 13 further includes a first controller 110 which controls the entire recording apparatus 13. The first controller 110 manages a timing when the maintenance is performed in terms of time, for example. The flushing is performed with the predetermined flushing interval time during the recording.

Furthermore, when the suction pump 64 is driven so that negative pressure is applied to the nozzles 24 while the cap 62 is disposed in the capping position, suction cleaning of forcibly sucking and discharging liquid from the liquid ejection head 25 through the nozzles 24 by the negative pressure is executed. The liquid discharged by the suction cleaning is accommodated in a waste liquid container 66 through the waste liquid path 63 as waste liquid. Furthermore, the maintenance apparatus 61 includes the wiping apparatus 67 having a wiping member (not illustrated) capable of wiping an opening surface of the liquid ejection head 25 on which the nozzles 24 are opened. In this embodiment, the wiping apparatus 67 is included in the maintenance apparatus 61. The wiping apparatus 67 performs a wiping operation of wiping the opening surface using the wiping member after an ejection operation or cleaning. The cleaning includes the wiping and the flushing performed after the suction cleaning.

The timing when the cleaning is performed may be managed in terms of time or may be managed by a result of nozzle inspection performed during recording. In the case of the time management, the cleaning is performed with a predetermined cleaning interval time. The cleaning interval time is sufficiently longer than the flushing interval time.

Furthermore, the recording apparatus 13 may include a nozzle inspection apparatus 70 (refer to FIG. 9) which inspects the nozzles 24 during the recording. The first controller 110 determines that the cleaning time is entered when one or a predetermined number of the nozzles 24 are determined as ejection failure as a result of nozzle inspection performed by the nozzle inspection apparatus 70. When the cleaning time is entered during recording, the first controller 110 retracts the support section 23 from the support position to the retracting position and moves the cap 62 from the retracting position to the capping position before driving the suction pump 64 so as to forcibly suck and discharge liquid from the nozzles 24 in the suction cleaning.

When the maintenance is performed, the support section 23 which supports the medium 12 which is a recording target is retracted from the support position which faces the liquid ejection head 25 to the retracting position which does not face the liquid ejection head 25, and therefore, the liquid ejection head 25 may not perform a recording operation. Furthermore, a predetermined period of time is required for a movement of the support section 23 to the retracting position and a movement of the cap 62 to the capping position in the maintenance. Therefore, since the recording operation is interrupted in the maintenance, transport of the recorded medium 12 is interrupted before the medium 12 reaches the post-processing apparatus 14 on a downstream side. Specifically, the recording operation is not performed due to the maintenance, and the recorded medium 12 may not be transported on the downstream side, that is, blank of recording occurs. The blank of recording further causes blank of the medium 12 to be received by the intermediate stacker 32 for a certain period of time after the medium 12 which has been subjected to the recording last before the maintenance reaches the intermediate stacker 32.

Next, a configuration of the medium processing apparatus 31 will be described in detail with reference to FIGS. 3 to 8.

Figure 3:
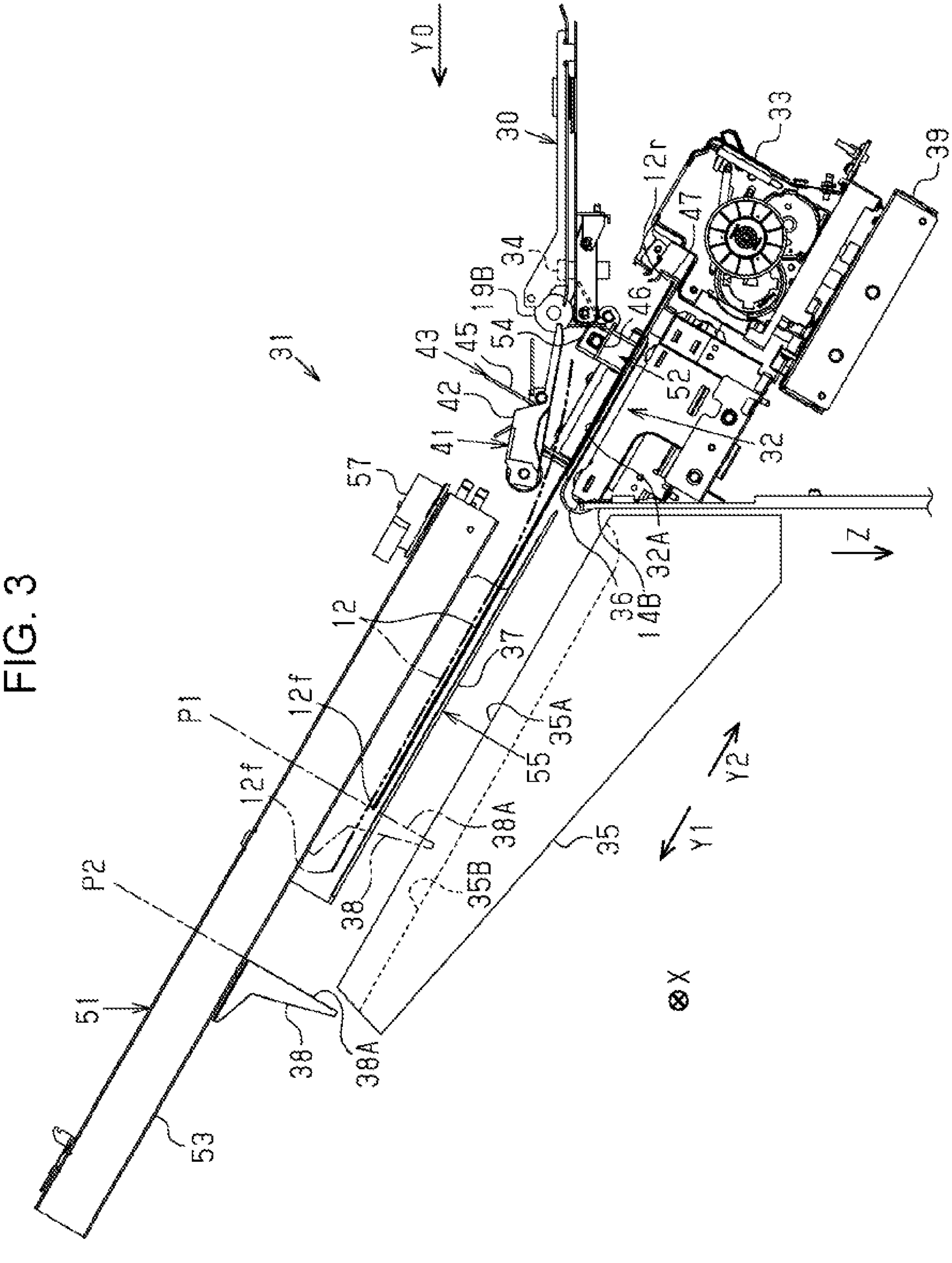
FIG. 3 is a side view illustrating a medium processing apparatus and peripherals in the post-processing apparatus.
Figure 5:
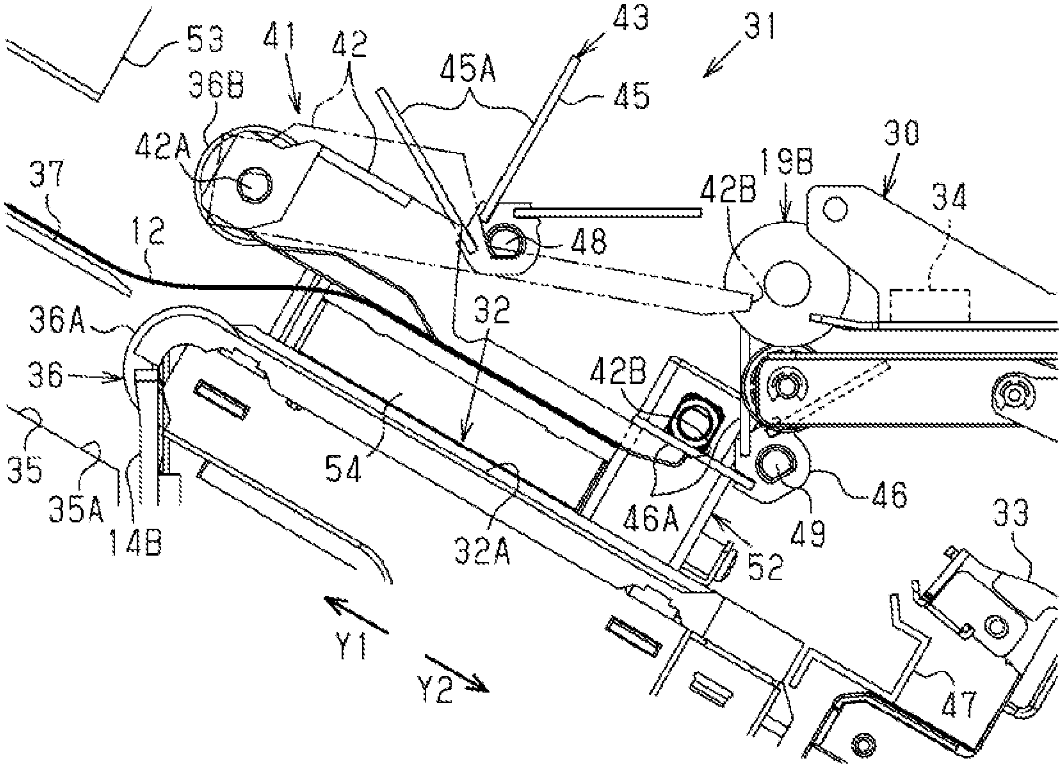
FIG. 5 is a side view of the medium processing apparatus and the peripherals.

As illustrated in FIG. 3, the medium processing apparatus 31 includes the intermediate stacker 32, the discharge mechanism 36, the medium support member 37, and the first aligning member 38 described above. The intermediate stacker 32 has a stacking surface 32A on which the received media 12 are stacked. The stacking surface 32A is a slant surface configured such that an upstream end in the first transport direction Y0 is lower than a downstream end in the vertical direction Z. The medium processing apparatus 31 further includes a reception mechanism 41 which changes a path of the medium 12 discharged from the transport mechanism 30 in a predetermined discharge speed to a path along the stacking surface 32A of the intermediate stacker 32 as another component. The reception mechanism 41 includes a movable guide 42 which operates such that the movable guide 42 knocks down the medium 12 discharged from the transport mechanism 30 in the predetermined discharge speed. As illustrated in FIG. 5, the reception mechanism 41 causes the movable guide 42 to knock down the medium 12 discharged from the transport mechanism 30 so as to guide the medium 12 to the intermediate stacker 32. Specifically, the reception mechanism 41 performs a portion of a reception operation of receiving the medium 12 by the intermediate stacker 32.

Figure 4:
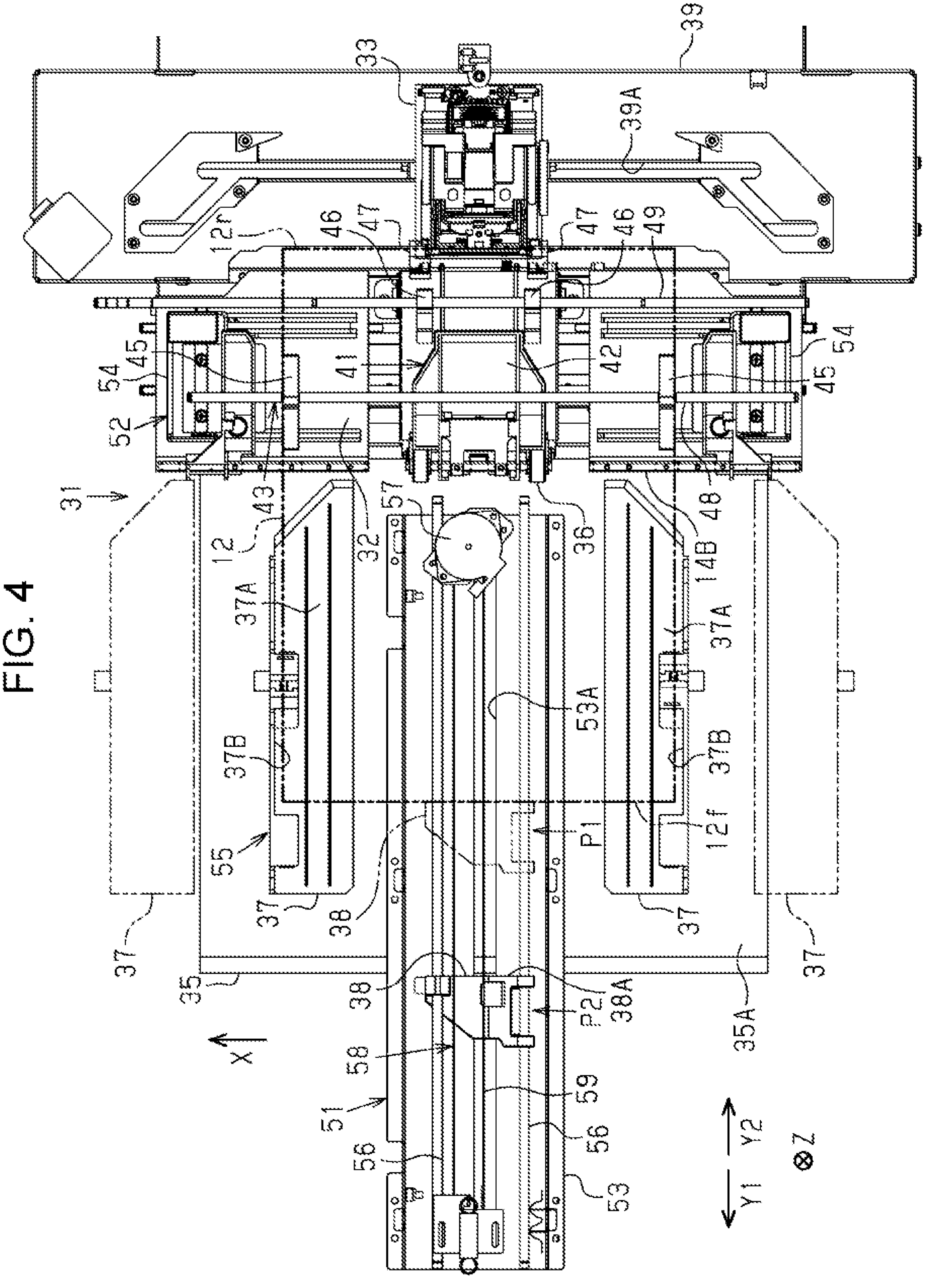
FIG. 4 is a plan view of the medium processing apparatus and the peripherals.

Furthermore, as illustrated in FIGS. 3 and 4, the medium processing apparatus 31 includes a supply mechanism 43 which supplies the medium 12 to a changed path in a second direction Y2 which is opposite to a first direction Y1 along the stacking surface 32A after operation of the reception mechanism 41 is started. The supply mechanism 43 includes first and second paddles 45 and 46 which are in contact with the medium 12 while being rotated so as to apply a transport force in the second direction Y2. In the two types of puddles 45 and 46, the first paddle 45 positioned on the downstream side in the transport direction Y1 has a function of receiving the medium 12 onto the stacking surface 32A by rotation of the first puddle 45.

As illustrated in FIGS. 3 and 4, the intermediate stacker 32 has a medium abutting portion 47 which aligns the media 12 in the transport direction Y1 by causing trailing ends 12*r* of the media 12 which have been received on the stacking surface 32A to abut on the medium abutting portions 47. The medium abutting portion 47 has a plane portion which extends upward in a predetermined shape from a downstream end portion of the intermediate stacker 32 in the second direction Y2 and which is orthogonal to the stacking surface 32A in a side view of FIGS. 3 and 5. The puddles 45 and 46 described above apply force to the media 12 on the intermediate stacker 32 in a direction toward the medium abutting portion 47. Note that the direction for aligning the media 12 which are received by the intermediate stacker 32 and which abut on the medium abutting portion 47 is also referred to as a "transport direction Y1".

When the trailing end 12*r*, which is a downstream end in the second direction Y2, of the medium 12 transmitted in the second direction Y2 by the supply mechanism 43 abuts on the medium abutting portion 47, the medium 12 is positioned in the transport direction Y1 using a position of the abutting as a reference. As illustrated in FIG. 4, a plurality of medium abutting portions 47 are disposed in the width direction X with a certain gap. The gap between the plurality of medium abutting portions 47 is set such that a medium 12 having the smallest width may abut in a plurality of portions.

As illustrated in FIGS. 3 and 4, the medium processing apparatus 31 includes a first aligning mechanism 51 which aligns the media 12 stacked on the intermediate stacker 32 in the transport direction Y and a second aligning mechanism 52 which aligns the media 12 in the width direction X. The first aligning mechanism 51 includes a long support frame 53 which extends upward relative to the discharge stacker 35 in the first direction Y1, the first aligning member 38 described above which is capable of reciprocating in the first direction Y1 along a lower surface of the support frame 53, and the medium abutting portions 47. The first aligning member 38 moves over the discharge stacker 35 in the transport direction Y1. Furthermore, the second aligning mechanism 52 includes a pair of second aligning members 54 which are capable of moving in the width direction X along the stacking surface 32A of the intermediate stacker 32. Note that, as illustrated in FIG. 3, the discharge stacker 35 has a recessed portion 35B on a stacking surface 35A so that contact with the first aligning member 38 is avoided.

As illustrated in FIG. 4, the intermediate stacker 32 has a predetermined length which is longer than a width of the medium 12 having the largest width in the width direction X. A center position of the intermediate stacker 32 in the width direction X corresponds to a center of a width of the medium 12 received on the intermediate stacker 32A. The movable guide 42 is positioned in an upper portion of a center of a width of the intermediate stacker 32. As illustrated in FIG. 5, the movable guide 42 knocks off a center portion of the medium 12 in the width direction X discharged from the transport mechanism 30 so as to change a path of the medium 12. Note that a plurality of movable guides 42 may be disposed in different positions in the width direction X. In this case, the movable guide 42 positioned in the center portion is operated when the medium 12 of a small size including a minimum width is used and the plurality of movable guides 42 are operated when the medium 12 of a large size having a predetermined width or more is used.

The movable guide 42 illustrated in FIG. 5 is positioned in a downstream end in the first transport direction Y0 and pivots within a predetermined angle range with a pivot shaft 42A at the center. The movable guide 42 pivots in a range between a waiting position denoted by a dashed two-dotted line in FIG. 5 and an operation position denoted by a solid line in FIG. 5 which is reached when the movable guide 42 pivots in a clockwise direction in FIG. 5 at a predetermined angle from the waiting position. A tip end 42B of the movable guide 42 in the waiting position is located in the vicinity of an upper portion of a discharge port of the pair of transport rollers 19B. The movable guide 42 pivots from the waiting position to the operation position so as to knock off the center portion of the width of the medium 12 discharged from the pair of transport rollers 19B of the transport mechanism 30 and guides the medium 12 to the stacking surface 32A of the intermediate stacker 32 which is a reception destination of the medium 12.

As illustrated in FIGS. 3 and 4, the medium processing apparatus 31 includes a medium support mechanism 55 having a pair of medium support members 37. The medium support member 37 supports tip ends of the media 12 stacked on the intermediate stacker 32. The medium support mechanism 55 moves the pair of medium support members 37 in the width direction X. As illustrated in FIGS. 3 and 4, the pair of medium support members 37 includes support surfaces 37A which support a lower surface of the medium 12 and guide surfaces 37B which guide side ends of the medium 12.

The support surfaces 37A extend in the first direction Y1 in a position which is the same height of a virtual surface formed by extending the stacking surface 32A of the intermediate stacker 32 in the first direction Y1 or a position slightly lower than the virtual surface. As illustrated in FIG.

4, the pair of medium support members 37 move in the width direction X in a position between a holding position indicated by a solid line in FIG. 4 where the medium 12 may be held by the pair of support surfaces 37A and a retracting position indicated by a dashed two-dotted line in FIG. 4 where the medium 12 may not be held by the pair of support surfaces 37A, for example. As illustrated in FIGS. 3 and 4, in a state in which the pair of medium support members 37 is disposed in the support position, tip end portions of the media 12 which are received by the intermediate stacker 32 are supported by the pair of support surfaces 37A and shifts in the width direction X among the media 12 fall within a tolerance range by the pair of guide surfaces 37B.

Note that, in this embodiment, the pair of medium support members 37 and the pair of second aligning members 54 are moved in the width direction X in synchronization with each other when shift is performed as the post-processing.

As illustrated in FIG. 4, the pair of first puddles 45 is fixed to a rotation shaft 48 which is positioned in an upper portion in the intermediate stacker 32, which extends in the width direction X, and which is axially supported. The two first puddles 45 are disposed with a predetermined gap (a first gap) in the width direction X. The pair of first puddles 45 may be in contact with the medium 12 of a large size having a width equal to or larger than a predetermined size at two portions in the width direction X. On the other hand, the second puddles 46 are fixed to a rotation shaft 49 which is positioned in an upper portion in the intermediate stacker 32, which extends in the width direction X in a downstream position relative to the rotation shaft 48 in a second direction Y2, and which is axially supported. The two second puddles 46 are disposed with a second gap which is smaller than the first gap between the two first puddles 45 in the width direction X. The pair of second puddles 46 may also be in contact with the medium 12 of a small size having a width equal to or smaller than the predetermined size at two portions in the width direction X.

The rotation shaft 48 illustrated in FIG. 4 is coupled to an electric motor (not illustrated) which is a driving source through a belt-type power transmission mechanism (not illustrated), for example, so that power is transmittable. Furthermore, the rotation shaft 49 is coupled to an electric motor (not illustrated) which is a driving source through a belt-type power transmission mechanism (not illustrated), for example, so that power is transmittable. Therefore, the first puddles 45 and the second puddles 46 are independently driven.

Each of the first puddles 45 includes a plurality of blades 45A having a length which reaches the stacking surface 32A. Furthermore, each of the second puddles 46 includes a plurality of blades 46A having a length which reaches the stacking surface 32A. The blades 45A are longer than the blades 46A. The first and second puddles 45 and 46 rotate in a counter-clockwise direction in FIG. 5 so as to perform an operation of transporting the medium 12 in a path changed by the pivot of the movable guide 42 such that the trailing end 12*r* abuts on the medium abutting portions 47. Specifically, the medium 12 of the large size is transported in the second direction Y2 by the two types of puddles, that is, the large paddles 45 and the small puddles 46. The medium 12 of a small size is transported in the second direction Y2 by the second puddles 46. By this, the medium 12 received by the intermediate stacker 32 returns in the second direction Y2 toward the medium abutting portions 47.

As illustrated in FIG. 4, the first aligning mechanism 51 includes the first aligning member 38, two guide shafts 56 which guide the first aligning member 38 in a movable manner, an electric motor 57 serving as a driving source, and a power transmission mechanism 58 which transmits driving force of the electric motor 57 to the first aligning member 38. The electric motor 57 and the power transmission mechanism 58 are assembled in the long support frame 53. The power transmission mechanism 58 includes a timing belt 59 wound in a pair of pulleys (not illustrated). The first aligning member 38 is fixed in a portion of the timing belt 59. When the electric motor 57 performs forward/reverse driving, the first aligning member 38 reciprocates in the transport direction Y1 along a guide groove 53A of the support frame 53.

As illustrated in FIGS. 3 and 4, the first aligning member 38 is disposed in a movable manner in a position between a first position P1 where an aligning operation is performed on the media 12 on the intermediate stacker 32 and a second position P2 which is separated from a tip end 12*f* of the medium 12 relative to the first position P1. The first aligning member 38 has a function of pushing the media 12 on the intermediate stacker 32 until the trailing ends 12*r* of the media 12 abut on the medium abutting portions 47. When the media 12 are discharged from the transport mechanism 30, the first aligning member 38 is located in the second position P2. Note that the first position P1 and the second position P2 of the first aligning member 38 may be changed depending on a size of the medium 12.

In FIG. 3, a position where the medium 12 transported in a path changed due to the operation of the reception mechanism 41 reaches a most downstream side is denoted by a dashed two-dotted line. The second position P2 is located where the tip end 12*f* of the medium 12 denoted by the dashed two-dotted line is not in contact with an aligning surface 38A. Therefore, the tip end 12*f* of the medium 12 discharged from the pair of transport rollers 19B is normally not in contact with the first aligning member 38 located in the second position P2 but is in contact with the first aligning member 38 only when the medium 12 is swiftly discharged. By this, the discharged medium 12 may not be unnecessarily supplied to a deep portion on the downstream side in the first transport direction Y0.

Figure 6:
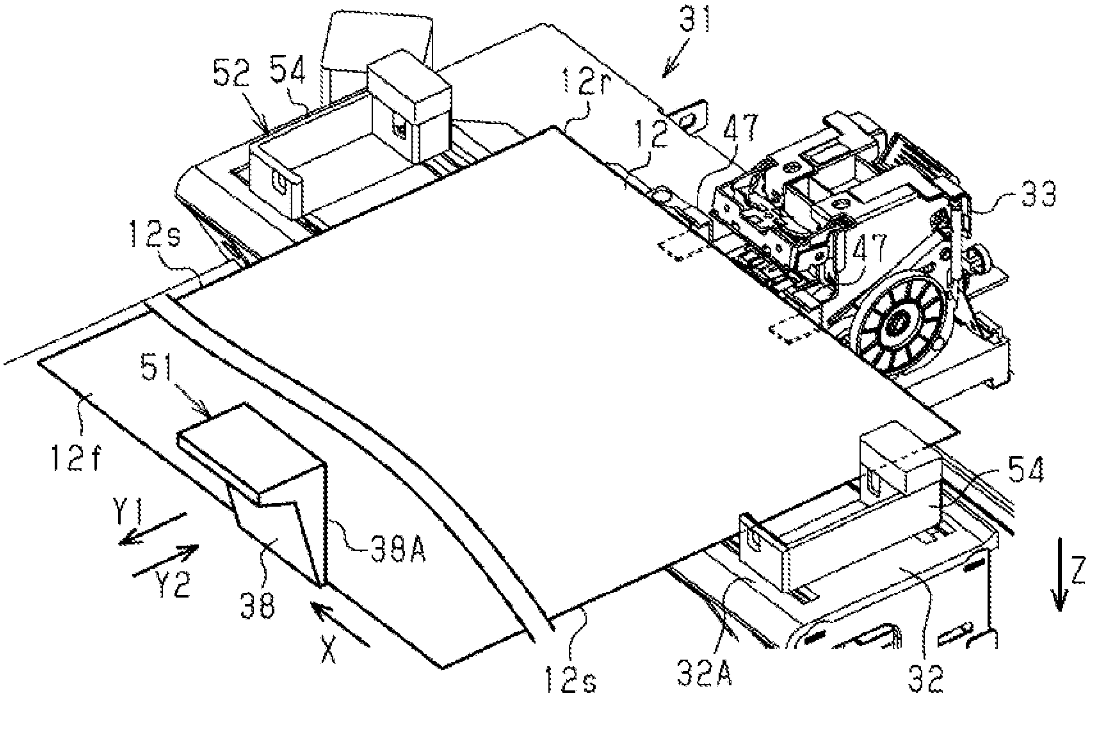
FIG. 6 is a perspective view of a portion of the medium processing apparatus which is used to illustrate an aligning process in a medium transport direction.

The medium 12 which is received by the stacking surface 32A is denoted by a solid line in FIGS. 3 and 6, and the medium 12 received by the stacking surface 32A is denoted by a dashed two-dotted line in FIG. 4. The first aligning member 38 is moved to the first position P1 (refer to FIG. 6) from the second position P2 illustrated in FIGS. 3 and 4 to be contact with the tip end 12*f* of the medium 12 so that the trailing end 12*r* of the medium 12 abuts on the medium abutting portions 47 with reliability. Specifically, the first aligning member 38 performs the first aligning operation of aligning the media 12 in the transport direction Y1 by sandwiching the media 12 between the first aligning member 38 and the medium abutting portions 47 in the first direction Y1. As illustrated in FIG. 5, the first aligning member 38 smashes the tip ends 12*f* of the media 12 by the aligning surface 38A so that the media 12 are aligned in the transport direction Y1.

The second aligning mechanism 52 includes two electric motors (not illustrated) which are driving sources which individually drive the two second aligning members 54 which align the media 12 on the intermediate stacker 32 in the width direction X. The pair of second aligning members 54 performs a second aligning operation of aligning the media 12 in the width direction X.

Figure 7:
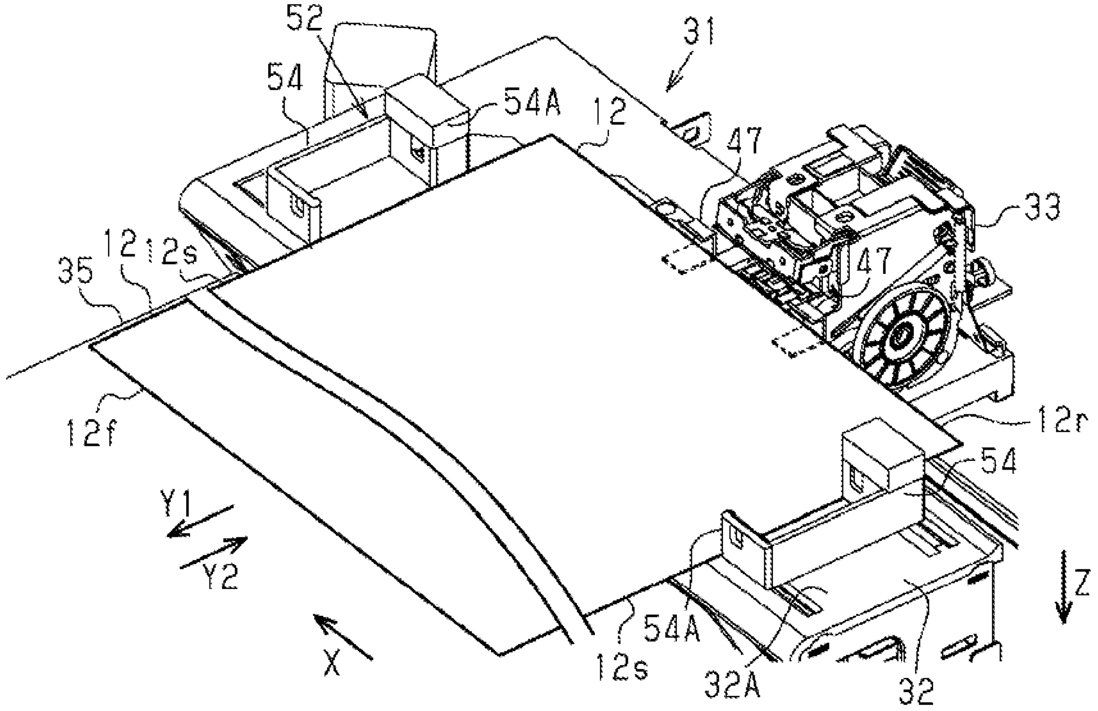
FIG. 7 is a perspective view of a portion of the medium processing apparatus which is used to illustrate an aligning process in a medium width direction.

The pair of second aligning members 54 has a function of moving in the width direction X while a gap between the second aligning members 54 is maintained and a function of changing the gap in the width direction X. As illustrated in FIG. 7, the second aligning members 54 have respective aligning surfaces 54A which face each other in the width direction X. The pair of second aligning members 54 performs the second aligning operation of aligning the media 12 in the width direction X by bringing the aligning surfaces 54A into contact with side ends 12*s* of the media 12 in the width direction X when the pair of second aligning members 54 is moved from a retracting position to an aligning position where the gap is narrowed in the width direction X. The aligning position of the pair of second aligning members 54 is determined in accordance with a width of the media 12 stacked on the intermediate stacker 32. The gap between the two aligning surfaces 54A is equal to a width size of the media 12 when the pair of second aligning members 54 is in the aligning position. The pair of second aligning members 54 aligns the media 12 in the width direction X by patting the side ends 12*s* while the media 12 are sandwiched by the second aligning members 54 in the width direction X in accordance with a size of the media 12 in a range from the maximum width to the minimum width. As illustrated in FIG. 7, the media 12 are aligned in the width direction X when the pair of the aligning surfaces 54A of the pair of second aligning members 54 pats the both side ends 12*s* of the media 12 in the width direction X.

In this embodiment, the aligning operation includes the first and second aligning operations to be performed to align the media 12 in the two directions. Note that the aligning operation may include only the first aligning operation or only the second aligning operation.

As illustrated in FIG. 4, the post-processing mechanism 33 is moved along a guide groove 39A on a stage member 39 so as to perform post-processing including flat stapling and oblique stapling on predetermined portions in any size of the media 12. Note that the post-processing mechanism 33 may have a function of a "punching process" and a "saddle stitching process" in addition to or instead of the "stapling process".

Figure 8:
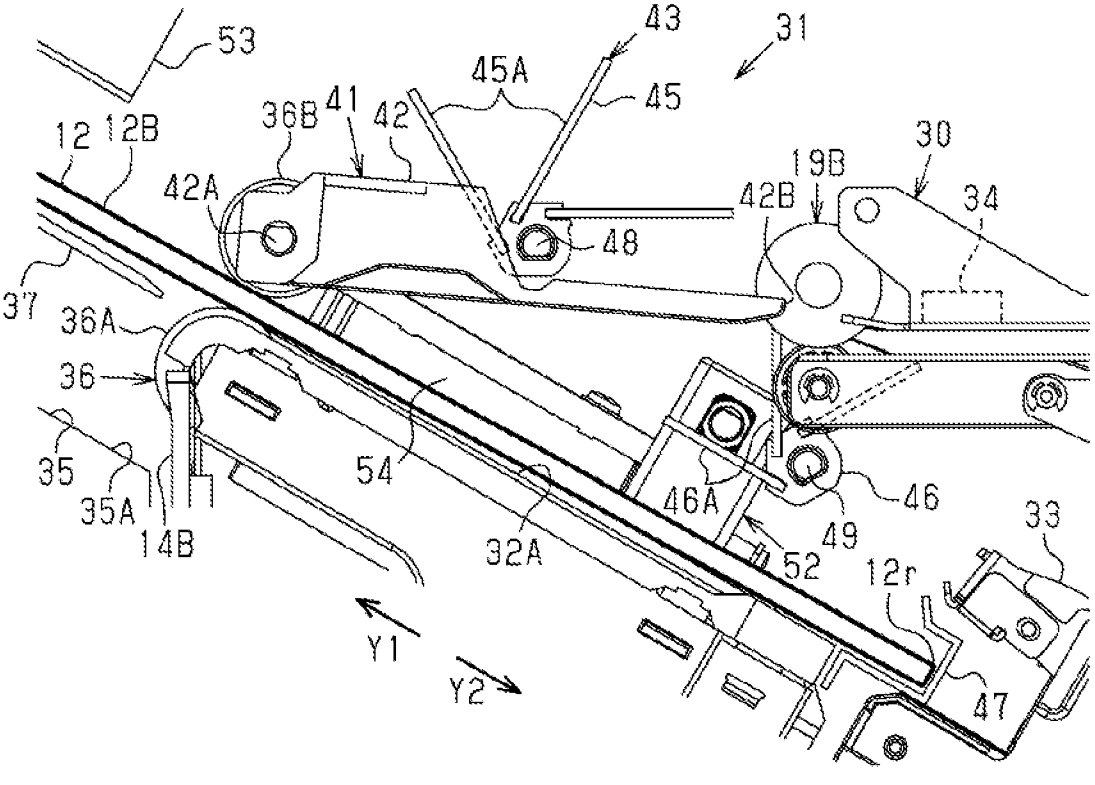
FIG. 8 is a perspective view of a portion of the medium processing apparatus which is used to illustrate a medium bundle discharge process.

A discharge operation will now be described with reference to FIG. 8. As illustrated in FIG. 8, the discharge mechanism 36 includes a pair of rollers, that is, a pair of a driving roller 36A and a driven roller 36B which are capable of pinching a medium bundle 12B on the intermediate stacker 32. In this embodiment, the driven roller 36B is axially supported by a base end portion of the movable guide 42. The driven roller 36B is moved between a separation position (a release position) illustrated in FIG. 5 which is separated from the driving roller 36A and a nip position illustrated in FIG. 8 where the medium 12 or the medium bundle 12B is nipped with the driving roller 36A.

The movement of the driven roller 36B between the nip position and the separation position may be performed when the movable guide 42 pivots with a position in the vicinity of the tip end 42B of the movable guide 42 as a pivot support point so as to change an orientation of the movable guide 42. The driven roller 36B is biased by a spring, not illustrated, in a direction toward the driving roller 36A.

The number of media 12 stacked on the intermediate stacker 32 is changed in accordance with the set number of media included in information on conditions for the post-processing set by the user. Therefore, a thickness of the medium bundle 12B subjected to the post-processing is changed in accordance with the set number of media 12 to be subjected to the post-processing. When the driven roller 36B is moved in the nip position in a state in which the media 12 is stacked on the intermediate stacker 32, the medium bundle 12B is nipped between the driving roller 36A and the driven roller 36B. The medium bundle 12B is discharged in the first direction Y1 when the discharge mechanism 36 is driven so that the rollers 36A and 36B which nip the medium bundle 12B are rotated. The medium bundle 12B is supported by the pair of medium support members 37 until a certain point in the discharge operation before dropping onto the discharge stacker 35 when the pair of medium support members 37 enlarges a gap therebetween. The discharge stacker 35 has the stacking surface 35A having a slope surface having a base end portion lower than a tip end portion in the vertical direction Z. The medium bundle 12B discharged to the discharge stacker 35 slips on the stacking surface 35A or an upper surface of a preceding medium bundle 12B stacked immediately before on the stacking surface 35A so that the trailing ends 12*r* abut on a standing wall 14B. In this way, the medium bundle 12B is stacked on the stacking surface 35A in a state in which the medium bundle 12B aligns in the transport direction Y1.

The discharge operation includes a discharge operation of discharging the medium bundle 12B at a predetermined timing without the post-processing and a discharge operation of discharging the medium bundle 12B at a timing immediately after the post-processing performed every time a set number of media 12 are stacked.

The pair of medium support members 37 supports the tip end portions of the media 12 stacked on the intermediate stacker 32 so as to suppress hanging down of the tip end portions. Therefore, if the tip end portions are hung down when the medium bundle 12B which is a block of a predetermined number of media 12 (refer to FIG. 8) which are stacked on the intermediate stacker 32 is discharged, the tip end portions may be reeled into an inside and folded. The pair of medium support members 37 is provided to suppress the hanging down of the tip end portions which causes such fold. The pair of medium support members 37 holds the media 12 until a certain point of the process of discharging the media 12 from the intermediate stacker 32 before being retracted to a retracting position where the media 12 may not be supported in the width direction X so that the medium bundle 12B drops onto the discharge stacker 35. Therefore, discharge of the media 12 from the intermediate stacker 32 in a state in which the tip end portions of the medium bundle 12B are in contact with the stacking surface 35A is suppressed and the reeling of the tip end portions of the medium bundle 12B is suppressed.

Here, the post-processing performed on the medium bundle 12B formed by the plurality of media 12 stacked on the intermediate stacker 32 is not limited to the stapling process. For example, the shift process is realized by a function of moving the pair of medium support members 37 and the pair of second aligning members 54 in the width direction X while the gaps thereof in the width direction X are maintained when the pair of medium support members 37 and the pair of second aligning members 54 hold the media 12. Specifically, when the shift process is instructed, the pair of medium support members 37 and the pair of second aligning members 54 which hold the medium bundle 12B are shifted in the width direction X by a predetermined shift amount. Here, although the "stapling process", the "saddle stitching process" and the like are post-processing to be performed every a target number of media, in a "normal stacking process" and the "shift process", the media may be discharged before the target number of media is reached on the intermediate stacker 32 as long as the media may be stacked on the discharge stacker 35 in a predetermined stacking method. For example, in the shift process performed every 50 sheets, 20 sheets in the 50 sheets, for example, may be first discharged, and thereafter, the remaining 30 sheets, for example, may be discharged in the same shift position.

In this way, in the "normal stacking process" and the "shift process", the discharge operation may be performed before the target number of sheets is reached. Specifically, the discharge operation which is an example of a process may be performed when the maintenance is performed. This is control in the first mode performed by the first controller 110 and a second controller 120 (refer to FIG. 9).

On the other hand, in the "stapling process" and the "saddle stitching process", the post-processing and the discharge operation as processes are required to be performed every a target number of media. Therefore, a timing of the process does not match a timing of the maintenance, and accordingly, a timing when the maintenance is to be performed is determined in accordance with the timing of the process including the post-processing and the discharge operation. This is control in the second mode performed by the first controller 110 and the second controller 120 (refer to FIG. 9).

In this embodiment, the post-processing mechanism 33 which performs the stapling process as an example of the post-processing serves as an example of the processor. Furthermore, the discharge mechanism 36 which performs the discharge operation which is a part of the process may be an example of the processor. Specifically, the processor includes the discharge mechanism 36 which discharges the media 12 stacked on the intermediate stacker 32 to an outside of the intermediate stacker 32. Furthermore, the medium support member 37 and the second aligning members 54 which perform the shift process as the post-processing are parts of the processor. In this case, the discharge mechanism 36 included in the processor performs a process of discharging the medium bundle 12B after bar-stacking. Furthermore, the medium support members 37 and the second aligning members 54 included in the processor perform a process of discharging the medium bundle 12B during shifting. Furthermore, the post-processing mechanism 33 may replace the stapling process by the punching process, the saddle stitching process, a folding process, or other processes, or may add other functions to the function of the stapling process. Then the processor executes the processes on the media 12 received by the intermediate stacker 32. Note that the processor includes a post-processing mechanism which executes the post-processing on a block of the media 12 stacked on the intermediate stacker 32. The post-processing performed by the post-processing mechanism includes at least one of the stapling process, the punching process, the shift process, the saddle stitching process, and the folding process.

Next, an electric configuration of the recording system 11 will be described with reference to FIG. 9.

Figure 9:
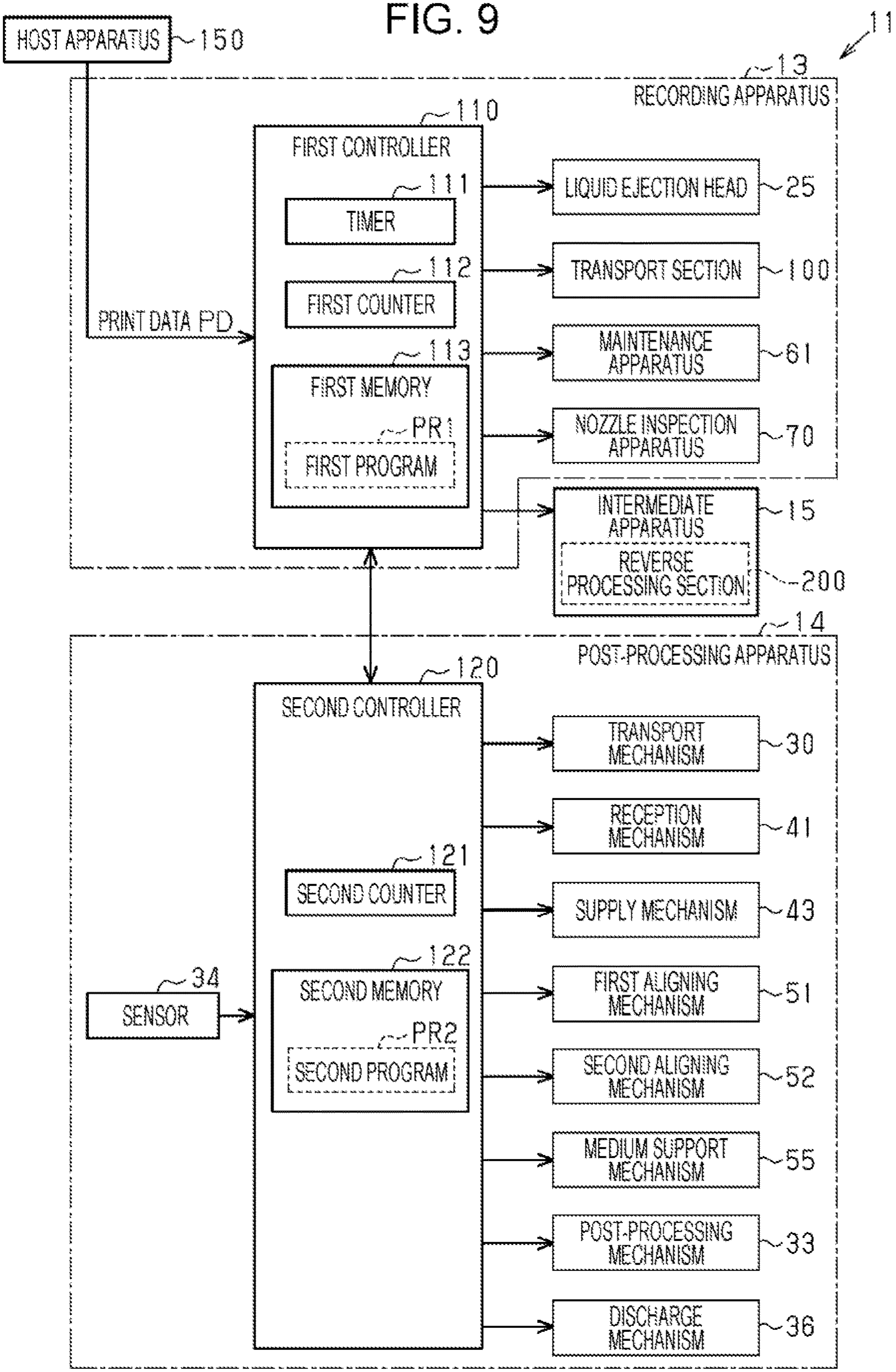
FIG. 9 is a block diagram illustrating an electric configuration of the recording system.

As illustrated in FIG. 9, the recording system 11 includes the first controller 110 as an example of a controller included in the recording apparatus 13 and the second controller 120 as an example of a controller included in the post-processing apparatus 14. The first controller 110 controls the components of the recording apparatus 13 and the intermediate apparatus 15. Furthermore, the second controller 120 controls the components of the post-processing apparatus 14. Specifically, the second controller 120 controls operations of processors included in the medium processing apparatus 31. The first controller 110 and the second controller 120 are coupled to each other through a communication cable (not illustrated) in a bidirectional-communication available manner. Note that the first controller 110 and the second controller 120 may be configured in a wireless-communication available manner.

The first controller 110 receives print data PD from a host apparatus 150, for example. The print data PD includes image data of a CMYK color system, for example, which defines print condition information and print content. The print condition information includes information on a medium size, a medium type, setting or non-setting of both-side printing, a print color, print quality, the total number of printed sheets, and post-processing condition information. The post-processing condition information includes content and the number of media for one post-processing.

As illustrated in FIG. 9, the first controller 110 transmits control signals to the liquid ejection head 25, a transport section 100, the maintenance apparatus 61, the nozzle inspection apparatus 70, and the intermediate apparatus 15. By this, the first controller 110 controls operations of the liquid ejection head 25, the transport section 100, the maintenance apparatus 61, the nozzle inspection apparatus 70, and the intermediate apparatus 15.

The first controller 110 periodically performs maintenance in a certain time point during a recording operation. As the maintenance performed by the maintenance apparatus 61, preliminary ejection is performed to discharge liquid which does not relate to recording from the liquid ejection head 25. In this case, the first controller 110 controls the support section 23 and the maintenance apparatus 61 so as to move the support section 23 to the retracting position and move the cap 62 to the capping position. Thereafter, the first controller 110 controls the liquid ejection head 25 so as to execute the preliminary ejection of discharging liquid which does not relate to recording from the liquid ejection head 25. The liquid discharged by the preliminary ejection is received by the cap 62. In this point, the liquid ejection head 25 which performs the preliminary ejection is also included in the maintenance section. Here, the preliminary ejection is also referred to as "flushing" in this specification. The flushing is executed in a flushing time TF which is set in advance. Specifically, the maintenance time when the flushing is executed as the maintenance corresponds to the flushing time TF.

Furthermore, the first controller 110 executes cleaning which is an operation of forcibly discharging liquid from the liquid ejection head 25 as the maintenance performed by the maintenance apparatus 61. In this case, the first controller 110 controls the support section 23 and the maintenance apparatus 61 so as to move the support section 23 to a retracting position and move the cap 62 to the capping position. Then the first controller 110 forcibly discharges liquid from the nozzles 24 of the liquid ejection head 25 by driving the suction pump 64 so that a closed space surrounded by a nozzle opening surface on which the nozzles 24 are opened in the liquid ejection head 25 and the cap 62 has negative pressure. The liquid discharged into the cap 62 is collected by the waste liquid container 66 through the waste liquid path 63. Here, the cleaning is performed in a cleaning time TC which is set in advance. Specifically, the maintenance time when the cleaning is executed as the maintenance corresponds to the cleaning time TC. The cleaning time TC is sufficiently longer than the flushing time TF.

The sensor 34 is electrically coupled to the second controller 120. The sensor 34 detects the medium 12 and outputs a detection signal. The first controller 110 detects the tip end **12*f* of the medium 12 when a non-detection state in which the sensor 34 does not detect the medium 12 is changed to a detection state in which the sensor 34 detects the medium 12. Furthermore, the first controller 110 detects the trailing end 12***r* of the medium 12 when the detection state in which the sensor 34 detects the medium 12 is changed to the non-detection state in which the sensor 34 does not detect the medium 12.

The second controller 120 transmits control signals to the transport mechanism 30, the reception mechanism 41, the supply mechanism 43, the first aligning mechanism 51, the second aligning mechanism 52, the medium support mechanism 55, the post-processing mechanism 33, and the discharge mechanism 36. By this, the second controller 120 controls operations of the mechanism 30, 33, 36, 41, 43, 51, 52, and 55.

Furthermore, the first controller 110 illustrated in FIG. 9 includes a computer, not illustrated. The first controller 110 includes a timer 111, a first counter 112, and a first memory 113 in the computer. The timer 111 counts an elapsed time T from a time point when preceding maintenance is performed. Specifically, the timer 111 counts two types of elapsed time, that is, an elapsed time T from a time point when preceding flushing is performed and an elapsed time T from a time point when preceding cleaning is performed. The first controller 110 determines whether the flushing time has reached and whether the cleaning time has reached based on the elapsed times T counted by the timer 111. Furthermore, the first counter 112 controlled by the first controller 110 counts the number of media recorded by the liquid ejection head 25 from a predetermined time in the recording apparatus 13. The predetermined time is a time when preceding maintenance is performed, for example, and the first counter 112 counts the number of recorded media until a time when next maintenance is performed. The memory 113 stores a first program PR1 including a program of a first mode control routine illustrated in a flowchart of FIG. 11 and a program of a second mode control routine illustrated in a flowchart of FIG. 13.

Furthermore, the second controller 120 illustrated in FIG. 9 includes a computer, not illustrated. The first controller 120 includes a second counter 121 and a second memory 122 in the computer. The second counter 121 controlled by the second controller 120 counts the number of media 12 stacked on the intermediate stacker 32 of the post-processing apparatus 14. The second controller 120 determines whether the number of media stacked on the intermediate stacker 32 has reached the set target number of media and whether the number of media stacked on the intermediate stacker 32 has reached a specified number of recorded media based on a counter value of the second counter 121. The memory 122 stores a second program PR2 including a program of a post-processing control routine in the first mode illustrated in the flowchart of FIG. 11 and a program of a post-processing control routine in the second mode illustrated in the flowchart of FIG. 13.

The first controller 110 and the second controller 120 perform consecutive recording by consecutively transporting the media 12 of cutform paper, for example, and successively performing recording on the media 12, and execute maintenance at a timing between the media 12 in the maintenance time. In the first mode, the maintenance is performed every time the predetermined maintenance time is reached and a timing when the medium processing apparatus 31 performs a process is determined based on the timing when the maintenance is executed. In the first mode, when the maintenance is performed in the maintenance time determined in advance in the course of the consecutive recording, the medium processing apparatus 31 performs processing after the medium 12 which has been last recorded before the maintenance is stacked on the intermediate stacker 32. The first controller 110 notifies the second controller 120 of the number of recorded media counted by the first counter 112 indicating order of the medium 12 which has been last recorded before the maintenance in a number of media stacked on the intermediate stacker 32 of the post-processing apparatus 14 in the maintenance time in the first mode.

In the second mode, the medium processing apparatus 31 performs processing on the medium bundle 12B every time the number of media 12 stacked on the intermediate stacker 32 reaches a set target number of media and determines a timing when the maintenance is performed in the recording apparatus 13 based on a timing of the execution of the processing. Note that an actual maintenance interval time is required to be suppressed within a predetermined maintenance interval time so that deterioration of a discharge state of the liquid ejection head 25 is suppressed. Therefore, the first controller 110 and the second controller 120 perform control in the second mode when a processing interval time which is an interval of the processing of the medium processing apparatus 31 is shorter than the predetermined maintenance interval time which is an interval of execution of the maintenance. In the second mode, the maintenance is performed in the course of the consecutive recording when recording on a last one of the media 12 which are targets of a process is terminated. Specifically, the first controller 110 executes the maintenance when recording on a last N-th media 12 in the set target number N of media which are targets of a process performed by the medium processing apparatus 31 is terminated. Here, the maintenance is executed when the recording on the last one of the media 12 of the targets of a process is terminated, since the maintenance is preferably started before the last medium 12 reaches the intermediate stacker 32. Note that the maintenance may be started after the last medium 12 reaches the intermediate stacker 32.

In the second mode, as the maintenance executed after recording on a last one of the media 12 which are targets of a process is terminated, light maintenance in which a smaller amount of liquid is discharged from the liquid ejection head 25 when compared with a case where the maintenance is performed at a predetermined maintenance interval time. This is because viscosity of liquid, such as ink, in the nozzles 24 of the liquid ejection head 25 is increased as the maintenance interval time is increased, and therefore, lighter maintenance is sufficient when the maintenance interval time is a second interval time which is shorter than a first interval time. Here, strength of the maintenance depends on an amount of liquid discharged from the nozzles 24. Therefore, in the second mode in which the maintenance is executed in an interval time shorter than the predetermined maintenance interval time, the light maintenance in which a smaller amount of liquid is discharged from the liquid ejection head 25 when compared with a normal mode in which maintenance is executed in a predetermined maintenance interval time is executed.

Here, the light maintenance in which an amount of liquid discharged from the liquid ejection head 25 is small corresponds to preliminary ejection of an ejection amount smaller than that in the normal mode in a case of the preliminary ejection or cleaning in which a suction amount is smaller than that in the normal mode in a case of cleaning. Here, in the cleaning, if a suction amount is small, a liquid discharge amount is also small. For example, in the second mode, since the flushing is executed with a second flushing interval time TI2 which is shorter than a first flushing interval time TI1 in the normal mode, light flushing in which an amount of liquid discharged from the liquid ejection head 25 is smaller than that in the normal mode is executed. Furthermore, in the second mode, since the cleaning is executed with a cleaning interval time which is shorter than that in the normal mode, light cleaning in which an amount of liquid discharged from the liquid ejection head 25 is smaller than that in the normal mode is executed. Note that the cleaning interval time in the second mode is set as a value obtained by subtracting a predetermined value equal to or larger than a processing time T2 from the cleaning interval time in the normal mode. Therefore, the cleaning time is reached when the recording on a set target number N of media is terminated, and therefore, the cleaning is executed earlier than the cleaning time in the normal mode.

Furthermore, the maintenance is performed in accordance with the maintenance interval time when a processing interval time which is an interval in which the medium processing apparatus 31 performs processing is longer than a predetermined maintenance interval time. Specifically, when a condition for the second mode is not satisfied, control in the normal mode is performed. In the normal mode, the maintenance is executed in accordance with the predetermined maintenance interval time.

Furthermore, in the control in the first and second modes, the first controller 110 starts maintenance immediately after recording on a last one of the media 12 subjected to the recording before the maintenance is terminated. Therefore, the maintenance is started before the medium 12 which is last subjected to the recording before the maintenance reaches the intermediate stacker 32.

Figure 10:
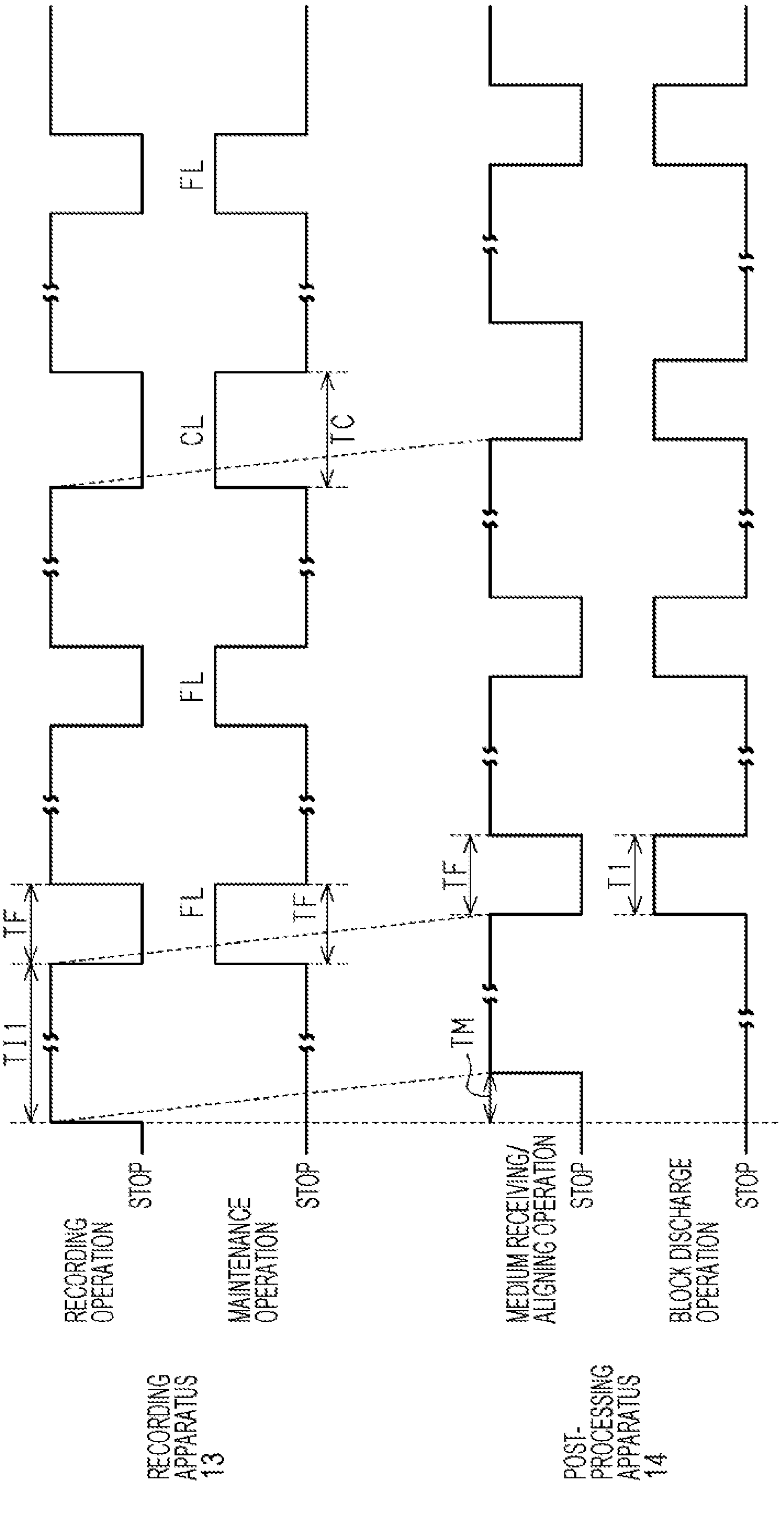
FIG. 10 is a timing chart illustrating an operation of the recording system in a first mode.

FIG. 10 is a timing chart of control in the first mode. An upper half in FIG. 10 is a timing chart of a recording operation and a maintenance operation performed by the recording apparatus 13, and a lower half in FIG. 10 is a timing chart of a medium receiving/aligning operation and a block discharge operation performed by the post-processing apparatus 14. Here, the medium receiving/aligning operation includes a medium receiving operation of receiving the media 12 on the intermediate stacker 32 and an aligning operation of aligning the media 12 received by the intermediate stacker 32. The medium receiving operation is performed by the transport mechanism 30, the reception mechanism 41, and the supply mechanism 43.

The maintenance operation is performed every predetermined maintenance interval time in the course of the recording operation. The maintenance operation includes the flushing FL executed every flushing interval time TI1 and cleaning CL executed every cleaning interval time. In the first mode, the medium 12 which has been last recorded before the maintenance reaches the intermediate stacker 32, and terminates an aligning operation performed on the last recorded medium 12. Thereafter, the medium processing apparatus 31 executes a block discharge operation as an example of a process performed on the medium bundle 12B stacked on the intermediate stacker 32. A block discharge time T1 required for the block discharge operation corresponds to an example of a processing time. When a condition in which the block discharge time T1 is shorter than the flushing time TF required for the flushing FL (T1<TF) is satisfied, stop of the recording operation due to the block discharge operation does not further occur. This is because the block discharge operation may be terminated within a period of time required for the maintenance operation. Note that if the condition "T1<TF" is not satisfied, a blank time may be used for the maintenance although the maintenance may not be terminated in the blank time.

Figure 12:
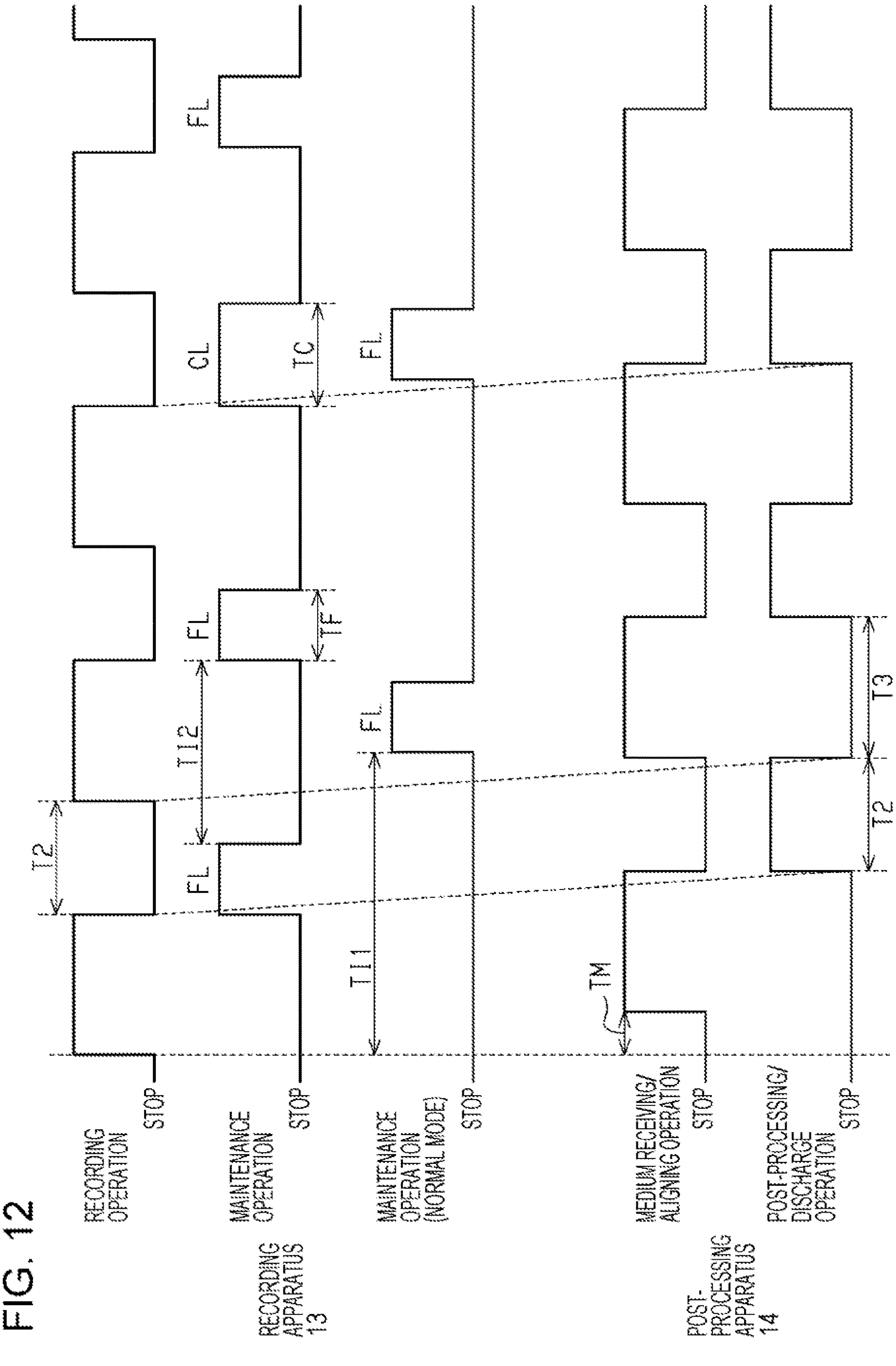
FIG. 12 is a timing chart illustrating an operation of the recording system in a second mode.

FIG. 12 is a timing chart of the control in the second mode. An upper half in FIG. 12 is a timing chart of the recording operation and the maintenance operation performed by the recording apparatus 13, and a lower half in FIG. 12 is a timing chart of the medium receiving/aligning operation and a post-processing/discharge operation performed by the post-processing apparatus 14. Here, the post-processing/discharge operation includes a post-processing operation of performing post-processing on the medium bundle 12B on the intermediate stacker 32 and a block discharge operation of discharging the medium bundle 12B which has been subjected to the post-processing from the intermediate stacker 32 to the discharge stacker 35. The post-processing operation corresponds to a stapling processing operation performed by the post-processing mechanism 33 when the stapling process, for example, is performed. The post-processing operation corresponds to a saddle stitching operation when the saddle stitching process, for example, is performed. The post-processing operation corresponds to a shift processing operation performed by the second aligning mechanism 52 and the medium support mechanism 55 when the shift process, for example, is performed. Note that the upper half in FIG. 12 also includes a timing chart of the flushing operation in the normal mode as a comparative example to indicate that a flushing interval in the second mode is short.

In the second mode, the maintenance is performed in the course of the consecutive recording, when recording on an N-th medium 12 which is the last one of a target set number N of media 12 included in targets of a process performed by the post-processing apparatus 14 is terminated. Therefore, the maintenance is started in a time point before a timing when the post-processing operation is started by a period of time corresponding to a transport time TM of the media 12. Then the post-processing apparatus 14 executes the post-processing operation and the block discharge operation as examples of the processing on the medium bundle 12B stacked on the intermediate stacker 32 after the last one of the media 12 before the maintenance has reached the intermediate stacker 32 and the aligning operation performed on the last one of the recorded media 12 is terminated. In FIG. 12, the post-processing operation and the block discharge operation are included in the "post-processing", and a period of time required for the post-processing is referred to as a post-processing time T2 and an interval time for the post-processing is referred to as a post-processing interval time T3.

Next, operation of the recording system 11 will be described.

The user inputs and sets recording condition information and post-processing condition information by operating a pointing device, such as a keyboard (not illustrated) or a mouse (not illustrated), of the host apparatus 150. The recording condition information includes a medium size, a medium type, a recording color, and the total number of recorded media. Furthermore, the post-processing condition information includes information indicating whether the post-processing is to be performed, content of the post-processing, and the set number of media. Examples of a process which does not include the post-processing include "bar-stacking", and examples of the post-processing include a "stapling process", a "punching process", a "shift process", a "saddle stitching process", and a "folding process". The set number of media corresponds to "the number of stacked media" 12 to be subjected to processing. For example, the set number of media indicates the number of media to be bound in the stapling process or the number of stacked media corresponding to a block of the media 12 to be shifted in the width direction X in the shift process.

The first controller 110 of the recording apparatus 13 receives the print data PD from the host apparatus 150. The first controller 110 obtains information including a medium size, a medium type, a print color, print quality, the total number of recorded media, and the post-processing condition information from recording condition information included in the print data PD. Furthermore, the first controller 110 obtains a type of the post processing, the set number of media to be subjected to the post-processing, and a position where the post-processing is to be performed.

The recording system 11 of this embodiment has the first and second modes in addition to the normal mode so as to enhance productivity. Hereinafter, control in the first mode will be described. Here, in the control in the first mode, a timing when the post-processing apparatus 14 performs processing is determined with the maintenance time in which the recording apparatus 13 executes the maintenance as a reference. Examples of the processing basically include processes which are executable even if the set number of media has not been reached so that the timing when the post-processing apparatus 14 performs the processing is determined using the maintenance time as a reference. For example, a case where the "normal stacking process" or the "shift process" is specified is a candidate of the first mode.

Figure 11:
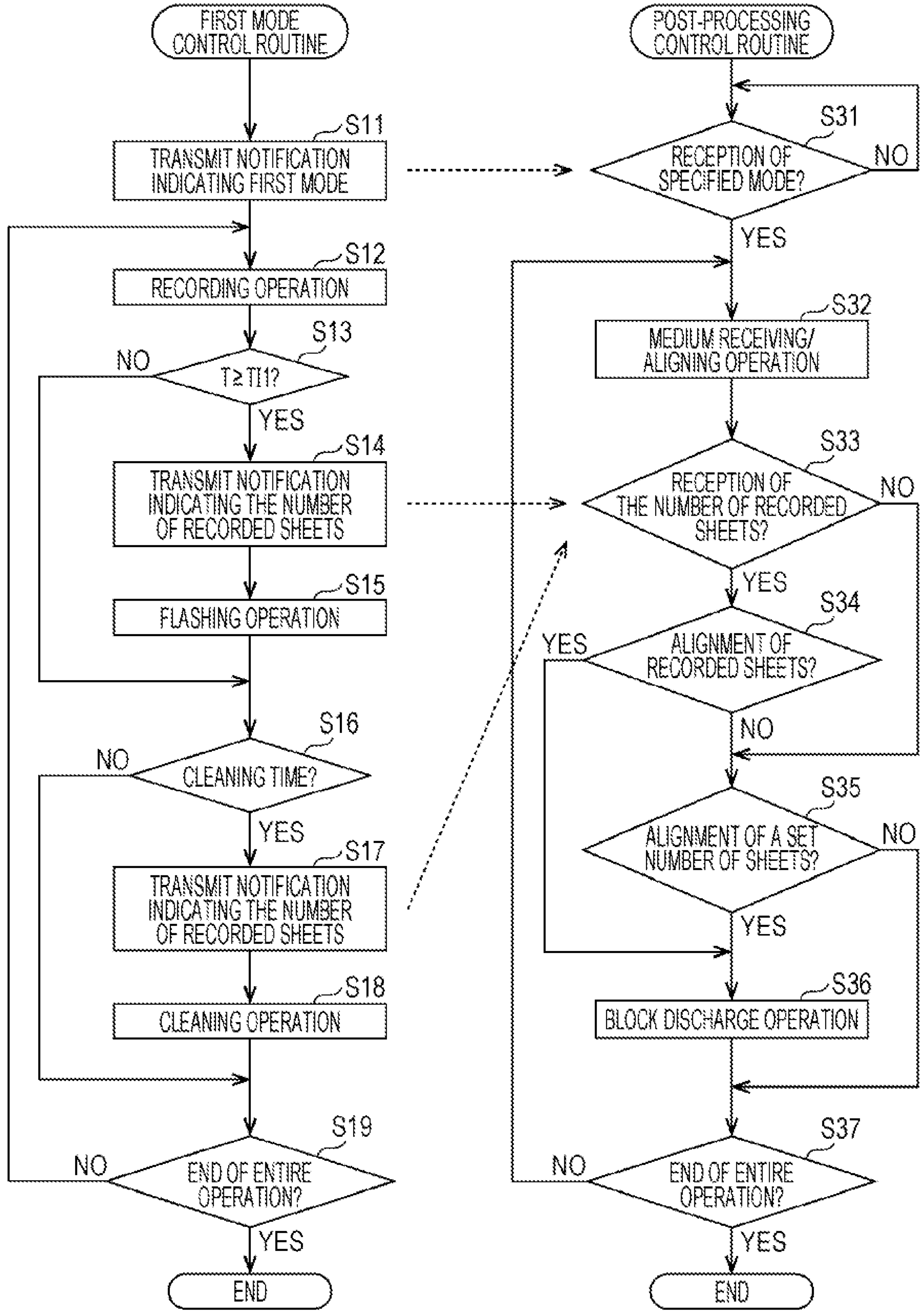
FIG. 11 illustrates flowcharts of recording control and post-processing control in the first mode.

Hereinafter, the first mode control executed by the first controller 110 will be described with reference to a flowchart of FIG. 11. In FIG. 11, a first mode control routine executed by the first controller 110 is illustrated on a left side and a post-processing control routine in the first mode executed by the second controller 120 is illustrated on a right side. Note that the cap 62 is in the capping position and the support section 23 is in the retracting position (the position denoted by the dashed two-dotted line in FIG. 2) before the recording operation is started.

When receiving the print data PD, the first controller 110 determines whether the post-processing is to be performed in accordance with the post-processing condition information included in the print data PD. When a type of the post-processing which is a candidate in the first mode is specified, the first mode is set and information indicating the first mode is transmitted to the second controller 120 (step S11).

Then the first controller 110 performs a recording operation (step S12).

Specifically, the first controller 110 first moves the cap 62 from the capping position to the retracting position and the support section 23 from the retracting position to the support position (the position indicated by the solid line in FIG. 2). Then the first controller 110 performs a recording operation including a transport operation of supplying the medium 12 from the cassette 20 and transporting the medium 12 at a predetermined speed along the transport path 17 and a liquid ejecting operation of recording an image on the medium 12 by ejecting liquid from the nozzles 24 of the liquid ejection head 25 to the transported medium 12.

When the liquid ejection head 25 enters a non-capping state, the first controller 110 causes the timer 111 to start counting so as to count an elapsed time T in the non-capping state. While the recording operation is performed, the first controller 110 determines whether the elapsed time T has reached the normal first flushing interval time TI1 (T≥TI1) (step S13). When the condition "T≥TI1" is satisfied, information on the number of recorded media indicating order of the medium 12 being recorded, that is, order of a last one of the media 12 before the maintenance in a number of media 12 stacked on the intermediate stacker 32 in the post-processing apparatus 14 is transmitted to the second controller 120 (step S14). The number of recorded media is obtained as described below, for example. The first controller 110 recognizes a current post-processing state including the number of media 12 stacked on the intermediate stacker 32 in the post-processing apparatus 14 through communication with various sensors (not illustrated) on the transport path 17 and the second controller 120. When the medium 12 which is last recorded before the maintenance is the last one of the media 12 of targets of a process on the intermediate stacker 32, the first controller 110 transmits information indicating order of the last medium 12 in a number of media 12 stacked on the intermediate stacker 32 as the number of recorded media. For example, the first controller 110 manages the number of recorded media indicating order of the currently recorded medium 12 in the media 12 stacked on the intermediate stacker 32 using the first counter 112 and transmits the information on the number of recorded media to the second controller 120.

Thereafter, the first controller 110 stops the recording operation when the recording on the last medium 12 before the maintenance is terminated and performs the flushing operation at a timing between the last medium 12 and a next medium 12 to be recorded (step S15). In this way, as illustrated in FIG. 10, every time the flushing time is reached during the recording operation, the recording operation is stopped and a switching operation is performed on the support section 23 and the cap 62 so that the cap 62 is located in the capping position. Then, as one of maintenance operations, the flushing FL is performed such that liquid which does not relate to recording is ejected from the nozzles 24 of the liquid ejection head 25 to the cap 62. When the flushing FL is terminated, the switching operation is performed on the cap 62 and the support section 23, and the entire operation of the flushing FL is terminated. Note that a position of the cap 62 disposed in the flushing FL is lower than the capping position by a predetermined distance and may be a liquid reception position which faces a lower portion of the liquid ejection head 25 with a gap.

Furthermore, the first controller 110 determines whether the cleaning time has been reached during the recording operation (step S16). When the cleaning time has been reached, information on the number of recorded media indicating order of the medium 12 being recorded, that is, a last one of the media 12 before the maintenance, in the media 12 stacked on the intermediate stacker 32 in the post-processing apparatus 14 is transmitted to the second controller 120 (step S17). This notification process is the same as that performed in step S14. Furthermore, when the cleaning time is reached, the cleaning operation is executed (step S18). Here, the timer 111 also counts an elapsed time T after a preceding cleaning execution time, and the first controller 110 determines that the cleaning time has been reached when the elapsed time T counted by the timer 111 has reached the cleaning interval time. Furthermore, the first controller 110 examines ejection failure of the nozzles 24 using the nozzle inspection apparatus 70 while the recording operation is performed. Also when at least one or at least a predetermined plurality of failure nozzles are detected, the first controller 110 determines that the cleaning time has been reached. When the cleaning time is reached, the first controller 110 performs the cleaning operation. By this, as illustrated in FIG. 10, the cleaning CL is performed as one of the maintenance operations when the cleaning time is entered during the recording operation. After a liquid forcible discharge operation is terminated in the cleaning CL, the switching operation is performed on the cap 62 and the support section 23 and the cleaning CL is terminated. The cleaning time TC which is a period of time required for the cleaning CL is longer than the flushing time TF which is a period of time required for the flushing FL. Specifically, the block discharge time T1 is shorter than the cleaning time TC. Therefore, the block discharge operation may be performed even in the cleaning operation using a blank time in which recording corresponding to the cleaning time TC is not performed.

Then the first controller 110 determines whether the entire operation is to be terminated (step S19). It is determined that the entire operation is to be terminated when all the specified number of media 12 which have been recorded are discharged after being processed in the post-processing apparatus 14 or when the user interrupts a print job based on the print data PD. When the entire operation is not to be terminated (the determination is negative in step S19), the process returns to step S12 and the process from step S12 to step S19 is performed again.

On the other hand, the second controller 120 performs next control in the post-processing apparatus 14 while the recording apparatus 13 performs the recording operation. When receiving a specified mode indicating the first mode specified to be employed in current control by the first controller 110 when the recording apparatus 13 starts the recording operation (the determination is affirmative in step S31), the second controller 120 starts the control in the first mode. Then the second controller 120 first performs the medium receiving/aligning operation (step S32). The second controller 120 performs a receiving operation of causing the transport mechanism 30 to transport the medium 12 supplied from the recording apparatus 13 through the intermediate apparatus 15 and causing the reception mechanism 41 to receive the medium 12 discharged from the transport mechanism 30 on the intermediate stacker 32. Furthermore, after the receiving operation, the second controller 120 performs an aligning operation of aligning the media 12 received on the intermediate stacker 32. Specifically, the second controller 120 knocks off the medium 12 discharged from the transport mechanism 30 by pivoting the movable guide 42 from the retracting position indicated by the dashed two-dotted line in FIG. 5 to the operation position indicated by the solid line in FIG. 5 so as to change the transport path 17 for transporting the medium 12 and supplies the medium 12 in the second direction Y2 by rotation of the two types of puddles, that is, the large puddles 45 and the small puddles 46. By this, the medium 12 is received by the stacking surface 32A.

After the receiving operation, the second controller 120 moves the first aligning member 38 from the second position P2 to the first position P1 (refer to FIG. 5) and knocks the tip end 12*f* of the medium 12 by the aligning surface 38A so as to cause the trailing end 12*r* of the medium 12 to abut on the medium abutting portions 47. In this way, the media 12 are aligned in the transport direction Y1. Thereafter, the second controller 120 moves the pair of second aligning members 54 from the retracting position (refer to FIG. 6) to the aligning position (refer to FIG. 7) in which the gap between the aligning members 54 becomes smaller and knocks the both ends 12*s* of the media 12 so as to align the media 12 in the width direction X. Consequently, the media 12 are aligned in the two directions on the intermediate stacker 32. In this way, the receiving operation and the aligning operation are performed in turn on the media 12 successively discharged from the transport mechanism 30 and the plurality of media 12 are stacked on the stacking surface 32A in an aligning state.

The second controller 120 determines whether a number of media corresponding to the number of recorded media supplied from the first controller 110 has been received (step S33). When a number of media corresponding to the number of recorded media are not received, it is determined whether alignment of the set number of media has been terminated (step S35). When the set number of media is not reached and the entire operation is not to be terminated (the determination is negative in step S37), the process in step S32 to step S37 is performed again. Specifically, after the medium receiving/aligning operation is performed on each of the media 12 (S32) and the alignment of the set number of sheets is terminated (the determination is affirmative in step S35), the block discharge operation is performed (S36). In the block discharge operation, the second controller 120 drives the pair of rollers of the discharge mechanism 36 for rotation while the pair of rollers of the discharge mechanism 36 nips a portion of the medium bundle 12B so that the medium bundle 12B is discharged from the intermediate stacker 32. Here, a gap between the medium support members 37 which support the medium bundle 12B being discharged is temporarily increased so that the medium bundle 12B is dropped on the discharge stacker 35. The medium bundle 12B which has been dropped on the discharge stacker 35 slides and drops on the stacking surface 35A or an upper surface of a preceding medium bundle 12B on the stacking surface 35A in the second direction Y2 and the trailing end 12*r* abuts on a standing wall 14B so as to be aligned in the transport direction Y1.

The post-processing apparatus 14 performs the block discharge operation every time the medium receiving/aligning operation is performed for the set number of media. On the other hand, after the media 12 corresponding to the number of recorded media notified by the first controller 110 are received (the determination is affirmative in step S33) when the recording apparatus 13 reaches the flushing time, it is determined whether alignment of the media 12 corresponding to the specified number of recorded media has been terminated (step S34). The second controller 120 receives the notification on the number of recorded media while the last medium 12 in the number of recorded media is being recorded or immediately after the last media 12 is recorded, and therefore, a predetermined period of time is required until the media 12 are transported to the post-processing apparatus 14 and are totally aligned. The second controller 120 continuously performs the medium receiving/aligning operation on the media 12 which are transported one by one in a period of time from when one of the media 12 which is last recorded before the flushing reaches to when the alignment of the media 12 is terminated. After the medium 12 which is last recorded before the flushing is received and aligned (the determination is affirmative in step S34), the block discharge operation is performed (S36). Specifically, even if the number of media 12 stacked on the intermediate stacker 32 does not reach the set number of media, when the alignment of the media 12 for the notified number of recorded media is terminated, the discharge mechanism 36 discharges the medium bundle 12B from the stacking surface 32A.

As illustrated in FIG. 10, the recording apparatus 13 performs the recording operation of successively performing recording on the media 12 which are consecutively transported. The medium 12 which has been subjected to the recording operation is received by the post-processing apparatus 14 in a delayed manner by a transport time TM required for transport to the post-processing apparatus 14 through the intermediate apparatus 15. Then the media receiving/aligning operation is successively performed on each of the transported media 12 in the post-processing apparatus 14, and in this way, the media 12 are stacked on the stacking surface 32A. In the recording apparatus 13, when the maintenance time is reached during the recording operation, the maintenance operation is performed. When the flushing time is reached, for example, the flushing FL is performed as a part of the maintenance. Furthermore, in the recording apparatus 13, when the cleaning time is reached, for example, during the recording operation, the cleaning CL is performed as a part of the maintenance.

Here, as illustrated in FIG. 10, the recording operation is temporarily stopped while the flushing FL is performed by the recording apparatus 13, and therefore, a blank time in which the medium 12 is not transported is generated by the flushing time TF in the post-processing apparatus 14. The post-processing apparatus 14 performs the block discharge operation using the blank time. Here, the post-processing apparatus 14 has obtained information on the number of recorded media, that is, order of the medium 12 which is last recorded before the flushing FL by the recording apparatus 13, and performs the block discharge operation when the number of media 12 which have been stacked on the stacking surface 32A and which have been subjected to the media receiving/aligning operation reaches the number of recorded media. Specifically, the post-processing apparatus 14 waits until the medium 12 which has been last recorded by the recording apparatus 13 before the flushing FL is transported and subjected to the medium receiving/aligning operation, and thereafter, performs the block discharge operation of discharging the medium bundle 12B including the last medium 12 on an uppermost portion thereof. Therefore, although the block discharge operation is performed using the blank time generated when the recording operation is temporarily stopped due to the flushing FL, all the media 12 recorded before the flushing including the last medium 12 are transported to the intermediate stacker 32 included in the post-processing apparatus 14 even after the flushing FL is started until all the media 12 are received by the intermediate stacker 32. The block discharge operation of discharging the medium bundle 12B including the last medium 12 is performed using the blank time of the recording generated due to the flushing FL. Therefore, the transport of the recorded media 12 is continuously performed even during the execution of the flushing FL.

Furthermore, as illustrated in FIG. 10, the recording operation is temporarily stopped while the cleaning CL is performed by the recording apparatus 13, and therefore, a blank time in which the medium 12 is not transported is generated by the cleaning time TC in the post-processing apparatus 14. The post-processing apparatus 14 performs the block discharge operation using the blank time. Here, the post-processing apparatus 14 has obtained information on the number of recorded media, that is, order of the medium 12 which is last recorded before the cleaning CL by the recording apparatus 13, and performs the block discharge operation when the number of media 12 which have been stacked on the stacking surface 32A and which have been subjected to the media receiving/aligning operation reaches the number of recorded media. Specifically, the post-processing apparatus 14 waits until the medium 12 which has been last subjected to the recording by the recording apparatus 13 before the cleaning CL is transported and subjected to the medium receiving/aligning operation, and thereafter, performs the block discharge operation of discharging the medium bundle 12B including the last medium 12 positioned on an uppermost portion thereof. Therefore, although the block discharge operation is performed using the blank time generated when the recording operation is temporarily stopped due to the cleaning CL, all the media 12 including the last medium 12 recorded before the cleaning are transported to the intermediate stacker 32 included in the post-processing apparatus 14 even after the cleaning CL is started until all the media 12 are received by the intermediate stacker 32.

Here, when the maintenance performed by the recording apparatus 13 and the process performed by the post-processing apparatus 14 are simultaneously started, reception of the medium 12 is required to be stopped in the post-processing apparatus 14 during the block discharge operation, and therefore, the transport of a predetermined number of media 12 including the medium 12 which has been last recorded before the maintenance is required to be totally stopped. On the other hand, in this embodiment, the maintenance performed by the recording apparatus 13 and the process performed by the post-processing apparatus 14 are performed with a time difference corresponding to the transport time TM required for the transport from the recording apparatus 13 to the post-processing apparatus 14, and therefore, the transport operation performed by the intermediate apparatus 15 and the post-processing apparatus 14 disposed on a downstream side relative to the liquid ejection head 25 is not required to be stopped even during the maintenance. Note that, if a predetermined number of media 12 which may be held by the intermediate apparatus 15 have been already held in the intermediate apparatus 15, the transport is required to be totally stopped. However, the stop is not required in this embodiment.

Furthermore, in the case where the maintenance performed by the recording apparatus 13 and the process performed by the post-processing apparatus 14 are simultaneously started, transport is totally stopped a large number of times, and therefore, a large amount of loss may occur due to the stop of the transport operation and rising after the stop. On the other hand, in this embodiment, transport is stopped a smaller number of times or not stopped on a downstream region relative to the liquid ejection head 25, and therefore, the loss caused by the stop of the transport operation and rising after the stop may be eliminated or reduced. Therefore, according to the recording system 11 of this embodiment which performs control with a time difference for starting the process after the maintenance in a delayed manner, productivity is improved when compared with the case where the maintenance and the process are simultaneously performed. Note that, when the "shift process" is performed as the specified post-processing, a process the same as the "normal stacking process" is performed except for the shift operation is performed before the block discharge operation. In this case, a sum of the shift operation required time and the block discharge operation required time corresponds to the block discharge time T1.

Next, control in the second mode will be described with reference to FIGS. 12 and 13.

Here, in the second mode, control for determining the maintenance time of the recording apparatus 13 is performed with a timing when the post-processing apparatus 14 starts the process as a reference. Therefore, the process of the post-processing apparatus 14 is preferentially performed, and accordingly, a process with the post-processing which does not allow the discharge operation to be performed until a set number of media 12 are stacked is also a target of the control in the second mode. For example, a case where the "stapling process" or the "saddle stitching process" is specified is a candidate in the second mode.

Hereinafter, the control in the second mode executed by the first controller 110 will be described with reference to a flowchart of FIG. 13. In FIG. 13, a second mode control routine executed by the first controller 110 is illustrated on a left side and a post-processing control routine in the second mode executed by the second controller 120 is illustrated on a right side. Note that the cap 62 is in the capping position and the support section 23 is in the retracting position (the position denoted by the dashed two-dotted line in FIG. 2) before the recording operation is started.

When receiving the print data PD, the first controller 110 determines whether the post-processing is to be performed in accordance with the post-processing condition information included in the print data PD. When the post-processing which is a candidate in the second mode is specified, the first controller 110 calculates a post-processing interval time T3 (step S41). The post-processing is performed with the post-processing time interval T3. The first controller 110 calculates the post-processing interval time T3 using the post-processing condition information included in the print data PD.

The first controller 110 determines whether a predetermined condition in which the post-processing interval time T3 is smaller than the first flushing interval time TI1 in the normal mode (T3<TI1) is satisfied. When the condition "T3<TI1" is not satisfied, control in the normal mode is performed (step S43). On the other hand, when the condition "T3<TI1" is satisfied, the second mode is set, and in addition, information indicating the second mode is transmitted to the second controller 120 (step S44).

The first controller 110 obtains the set number of media which is the target number of media 12 which are targets of the post-processing and which are to be stacked on the intermediate stacker 32 (step S45). Then the first controller 110 performs a recording operation. First, the first controller 110 moves the cap 62 from the capping position to the retracting position and the support section 23 from the retracting position to the support position (the position indicated by the solid line in FIG. 2). Then the first controller 110 performs a recording operation including a transport operation of supplying the medium 12 from the cassette 20 and transporting the medium 12 at a predetermined speed along the transport path 17 and a liquid ejecting operation of recording an image on the medium 12 by ejecting liquid from the nozzles 24 of the liquid ejection head 25 to the transported medium 12 (step S46).

When the liquid ejection head 25 enters a non-capping state, the first controller 110 causes the timer 111 to start counting so as to count an elapsed time T in the non-capping state. The first controller 110 causes the first counter 112 to count the number of media subjected to the recording operation. Specifically, the first counter 112 counts the number of recorded media as the number of media 12 stacked on the intermediate stacker 32 in the post-processing apparatus 14. Therefore, the first counter 112 is reset every time a counted value reaches the set number of media.

The first controller 110 determines a timing and a type of the maintenance in consecutive recording in which the media 12 which are consecutively transported are successively subjected to recording in a process from step S47 to step S49. The first controller 110 determines whether the recording is terminated for the set number of media (step S47). Specifically, the first controller 110 determines whether the number of media counted by the first counter 112 has reached the set number of media which are targets of the post-processing. The first controller 110 regularly or irregularly updates a count value of the first counter 112 so that the first counter 112 accurately counts order of the medium 12 being recorded in the number of media stacked on the intermediate stacker 32. The first controller 110 updates the count value of the first counter 112 using information on the number of media stacked on the intermediate stacker 32 which is obtained by the communication with the various sensors (not illustrated) on the transport path 17 and the second controller 120. Then the first controller 110 determines whether a last one of the media 12 which are stacked on the intermediate stacker 32 and which are targets of a process has been subjected to recording in a determination process in step S47.

Before the recording for the set number of media is terminated, the first controller 110 determines whether the elapsed time T becomes the first flushing interval time TI1 in the normal mode (T≥TI1) (step S49). When the condition "T≥TI1" is not satisfied and before the entire operation is terminated (the determination is negative in step S52), the process returns to step S46 and the recording operation is continuously performed. When the recording for the set number of media is terminated (the determination is affirmative in step S47), it is determined whether the cleaning time has been reached (step S48). It is assumed here that the first controller 110 determines a time when the elapsed time T counted by the timer 111 after an end of preceding cleaning reaches the cleaning interval time as the cleaning time, and in addition, causes the nozzle inspection apparatus 70 to examine discharge failure of the nozzles 24 while the recording operation is performed, and determines that the cleaning time has been reached even when a predetermined number of failure nozzles or more are detected. When the cleaning time is not reached, the first controller 110 executes the flushing operation (step S50).

The first controller 110 performs the cleaning operation when the recording for the set number of media is terminated and the cleaning time is reached (step S51). Specifically, when the recording for the set number of media is terminated and when the cleaning time is reached, the cleaning operation is performed in preference to the flushing operation whereas when the cleaning time is not reached, the flushing operation is executed. In this way, as illustrated in FIG. 12, when the post-processing apparatus 14 performs the medium receiving/aligning operation, the media 12 are stacked on the intermediate stacker 32. The flushing start time is reached when the recording apparatus 13 has recorded a last one of the set number of media 12 which are targets of the post-processing as a process and which are stacked on the intermediate stacker 32. Specifically, a time before the timing when the set number of media 12 have been stacked on the intermediate stacker 32 by the post-processing apparatus 14 by the transport time TM required for the transport of the media 12 from the recording position in a recording apparatus 13 to a medium reception position on the intermediate stacker 32 in the post-processing apparatus 14 corresponds to the maintenance time. In this embodiment, a time when the number of recorded media counted by the first counter 112 reaches the set number of media corresponding to order of the last one of the media 12 which are targets of a process performed by the post-processing apparatus 14 is determined as the maintenance time.

Therefore, the flushing FL is performed as a maintenance operation every time the recording apparatus 13 terminates the recording for the set number of media, and the cleaning CL is performed as a maintenance operation in a case where a time when the recording for the set number of media is terminated is also the cleaning time. In this case, since the condition “T3<TH” is satisfied (the determination is affirmative in step S42), the flushing FL to be performed every time the recording for the set number of media is terminated is performed every second flushing interval time TI2 which is shorter than the first flushing interval time TI1 in the normal mode.

In the second mode, the recording apparatus 13 terminates the recording for the set number of media before the elapsed time T reaches the first flushing interval time TI1. Therefore, normally, the condition “T≥TI1” is not satisfied in step S49, and the recording apparatus 13 executes the flushing operation every time the recording for the set number of media is terminated. However, when the condition “T≥TI1” is satisfied (the determination is affirmative in step S49) since the elapsed time T reaches the first flushing interval time TI1 before the recording for the set number of media is terminated since a long period of time is required for the recording for the set number of media for some reason, the first controller 110 executes the flushing operation (step S50).

Here, as illustrated in FIG. 12, the flushing operation is performed in the second flushing interval time TI2 which is shorter than the first flushing interval time TI1, and therefore, flushing which discharges a smaller amount of liquid when compared with the normal mode is preferably performed. Furthermore, the cleaning interval time in the second mode is shorter than the cleaning interval time in the normal mode, and even if an actual cleaning interval time is longest when the number of recorded media reaches the set number of media, the actual cleaning interval time is still suppressed to be equal to or shorter than the cleaning interval time in the normal mode. Therefore, if the actual cleaning interval time counted by the timer 111 is shorter than the cleaning interval time in the normal mode, an amount of liquid discharged from the nozzles 24 of the liquid ejection head 25 in the cleaning operation is preferably reduced when compared with the normal mode in accordance with a time difference between the actual cleaning time and the cleaning time.

Figure 13:
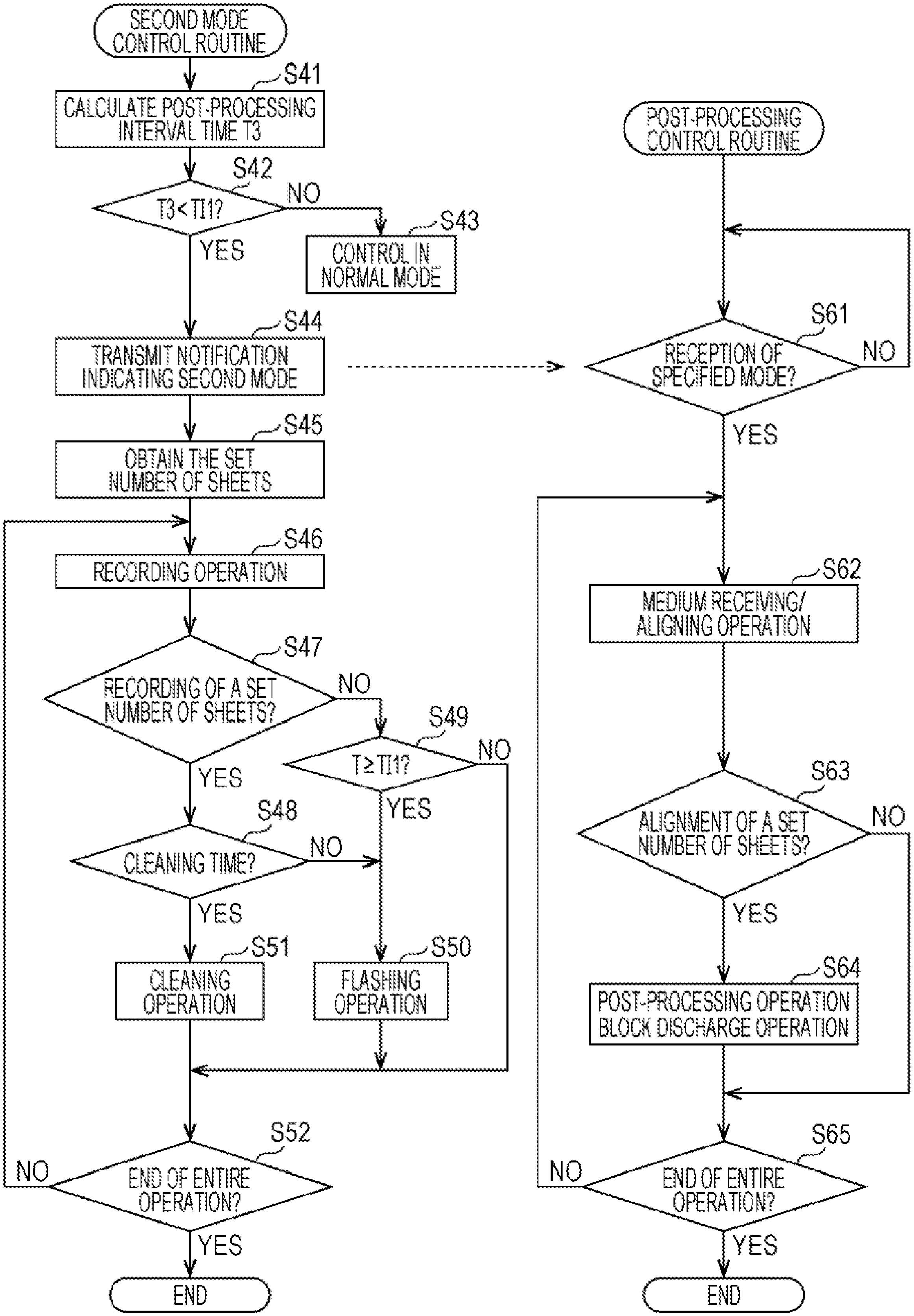
FIG. 13 illustrates flowcharts of recording control and post-processing control in the second mode.

On the other hand, in the post-processing apparatus 14, the second controller 120 performs the post-processing control routine illustrated in FIG. 13. When receiving a specified mode indicating the second mode specified to be employed in current control by the first controller 110 when the recording apparatus 13 starts the recording operation (the determination is affirmative in step S61), the second controller 120 starts the control in the second mode. Then the medium receiving/aligning operation is first performed on the media 12 which are transported from the recording apparatus 13 through the intermediate apparatus 15 (step S62). Specifically, the second controller 120 performs a reception operation of causing the transport mechanism 30 to transport the medium 12 supplied to the post-processing apparatus 14 and causing the reception mechanism 41 to receive the medium 12 discharged from the transport mechanism 30 on the intermediate stacker 32. Furthermore, after the receiving operation, the second controller 120 performs an aligning operation of aligning the media 12 received on the intermediate stacker 32. The process in step S62 is the same as that in step S32 of FIG. 11. In this way, the receiving operation and the aligning operation are performed in turn on the media 12 successively discharged from the transport mechanism 30 and the plurality of media 12 are aligned in a stacked state on the stacking surface 32A.

While the medium receiving/aligning operation is performed, the second controller 120 determines whether alignment of a set number of media has been terminated (step S63). When the determination is negative in step S37 and the entire operation is not terminated (the determination is negative in step S65), the process in step S62 to step S65 is performed again. Specifically, after the medium receiving/aligning operation is performed on each of the media 12 (S62) and the alignment of the set number of media is terminated (the determination is affirmative in step S63), the post-processing operation and the block discharge operation is performed (S64). Here, when the stapling process is specified as the post-processing, the second controller 120 drives the post-processing mechanism 33 so as to perform the stapling process operation on the medium bundle 12B. Furthermore, when the saddle stitching process is specified as the post-processing, the second controller 120 drives a post-processing mechanism for the saddle stitching (not illustrated) so as to perform the saddle stitching operation on the medium bundle 12B. Moreover, when the shift process is specified as the post-processing, the second controller 120 drives the second aligning mechanism 52 and the medium support mechanism 55 so as to perform the shift process operation on the medium bundle 12B. The block discharge operation included in the post-processing/discharge operation is the same as the process in step S36 of FIG. 11, and is performed when the second controller 120 controls the discharge mechanism 36 and the pair of medium support members 37. As a result of the block discharge operation, the medium bundle 12B is stacked on the discharge stacker 35.

As illustrated in FIG. 12, the recorded media 12 supplied from the recording apparatus 13 are received by the post-processing apparatus 14 in a delayed manner by the transport time TM required for transporting the media 12 to the post-processing apparatus 14 through the intermediate apparatus 15. When the medium receiving/aligning operation is performed on the individual media 12 and the number of media 12 stacked on the stacking surface 32A reaches the set number of media, the post-processing/discharge operation including the post-processing operation and the block discharge operation is performed as processing.

Here, as illustrated in FIG. 12, when the recording apparatus 13 terminates recording of a last one of the media 12 corresponding to the set number of media 12 of the targets of a process, the flushing FL or the cleaning CL is performed as the maintenance operation. Even during the maintenance operation, transport of the recorded media 12 is continuously performed. The post-processing apparatus 14 waits for an operation of transporting a last one of the media 12 before the maintenance and stacking the medium 12 on the intermediate stacker 32, and thereafter, performs the post-processing/discharge operation on the medium bundle 12B including the last medium 12 as the target of one of the post-processing. The recording operation is temporarily stopped during the maintenance operation, and therefore, a blank time in which the recorded media 12 are not transported to the post-processing apparatus 14 is generated. The post-processing/discharge operation is performed utilizing the blank time.

Furthermore, as illustrated in FIG. 12, the intermediate stacker 32 may not receive the media 12 during the post-processing/discharge operation including the post-processing operation and the block discharge operation, and therefore, the recording apparatus 13 stops the recording operation in the post-processing time T2. However, a portion of the time T2 during which the recording operation is stopped is used for the flushing operation or the cleaning operation, and therefore, the blank time of the recording operation may be effectively used for the maintenance operation.

Furthermore, in the case where the maintenance performed by the recording apparatus 13 and the process performed by the post-processing apparatus 14 are simultaneously started which is a general configuration, reception of the medium 12 is stopped in the post-processing apparatus 14 during the processing including the post-processing operation and the block discharge operation, and therefore, the transport of a predetermined number of media 12 including the medium 12 which has been last recorded before the maintenance is totally stopped. On the other hand, in the second mode of the embodiment, the maintenance of the recording apparatus 13 and the processing of the post-processing apparatus 14 are performed with a time difference corresponding to the transport time TM, and therefore, the transport operation of the recorded media 12 is continuously performed even during the maintenance operation.

Here, if the entire transport of the media 12 is frequently stopped, a temporal loss may be increased due to deceleration at a time of the stop of the transport operation and acceleration at a time of start after the stop. On the other hand, in this embodiment, transport is stopped a smaller number of times or not stopped on a downstream region relative to the liquid ejection head 25, and therefore, the temporal loss caused by the stop of the entire transport and the start after the stop may be eliminated or reduced. Therefore, productivity of the recording system 11 of this embodiment is improved when compared with the general configuration in which the maintenance and the processing are simultaneously performed.

Furthermore, when the entire transport of the recorded media 12 is stopped as the general configuration, a drying time of the recorded media 12 in the course of transport of the media 12 from the recording position of the recording apparatus 13 to the intermediate stacker 32 in the post-processing apparatus 14 is changed, and therefore, an adverse effect of accuracy of the post-processing performed on the medium bundle 12B caused by variation of a dry degree is a matter of concern. For example, in a case where a drying apparatus is disposed between the recording apparatus 13 and the post-processing apparatus 14, a drying time of the drying apparatus for drying the media 12 is excessively increased due to the stop of the entire transport of the recorded media 12 and recording quality of the medium 12 and the post-processing accuracy of the medium bundle 12B are degraded. In particular, if the drying apparatus is a heater, the adverse effect is significant. However, according to this embodiment, even in the recording system 11 including the drying apparatus, the stop of the entire transport of the recorded media 12 is eliminated or reduced, and therefore, degradation of quality of the media 12 and the medium bundle 12B may be avoided.

As described above, according to this embodiment, the following effects may be attained.

(1) The medium processing apparatus 31 includes the intermediate stacker 32 on which the media 12 recorded by a recording apparatus 13 are stacked, the recording apparatus 13 having the liquid ejection head 25 which performs recording by ejecting liquid to the media 12 and the maintenance apparatus 61 which performs maintenance of the liquid ejection head 25, and the processor which executes a process on the media 12 received by the intermediate stacker 32. In the method for controlling the medium processing apparatus 31, the process is executed after one of the media 12 which is last recorded before the maintenance is stacked on the intermediate stacker 32. Accordingly, in the first mode, the post-processing apparatus 14 may perform the processing using the blank time in which the medium 12 is not transported since the maintenance is performed on the recording apparatus 13, and therefore, productivity is improved. Furthermore, transport of the medium 12 which is last recorded before the maintenance may be continuously performed even during the maintenance. Accordingly, a temporal loss caused by a stop of the transport of the recorded media 12 during the maintenance may be suppressed or reduced. Therefore, productivity is improved when compared with the general configuration in which the maintenance and the processing are simultaneously performed. Consequently, the processing may be performed using the blank time in which the medium 12 is not transported since the maintenance is performed, while stop of the transport of the recorded media 12 during the maintenance is avoided. Furthermore, when the recording system 11 includes a drying apparatus, deterioration of recording quality of the media 12 and deterioration of post-processing quality of the medium bundle 12B caused by variation of a drying degree may be suppressed. Accordingly, inconvenience in productivity caused by the stop of the transport of the recorded media 12 during the maintenance may be avoided.

(2) The recording system 11 includes the recording apparatus 13 and the post-processing apparatus 14. In the method for controlling the recording system 11, the process is executed after one of the media 12 which is last recorded before the maintenance is stacked on the intermediate stacker 32. In the first mode, the post-processing apparatus 14 may perform the process utilizing the blank time in which the medium 12 is not transported since the maintenance is performed on the recording apparatus 13, and therefore, the productivity is improved. Furthermore, in the second mode, the maintenance is performed in the blank time in which the recording is not performed by the recording apparatus 13 since reception of the medium 12 is temporarily stopped due to the post-processing performed by the post-processing apparatus 14, and therefore, the productivity is improved. Furthermore, the transport of the medium 12 which is last recorded before the maintenance may be continuously performed even during the maintenance. Accordingly, a temporal loss caused by a stop of the transport of the recorded media 12 during the maintenance may be suppressed or reduced. Consequently, the productivity is improved when compared with the general configuration in which the maintenance and the post-processing are simultaneously performed. Furthermore, in a case where the recording system 11 includes a drying apparatus, deterioration of recording quality of the media 12 and deterioration of post-processing quality of the medium bundle 12B caused by variation of a drying degree may be suppressed.

(3) In the method for controlling the recording system 11, the maintenance is started before the medium 12 which is last recorded before the maintenance reaches the intermediate stacker 32. Therefore, the blank time in which the medium 12 is not transported to the post-processing apparatus 14 since the recording operation is temporarily stopped due to the maintenance may be reduced, and accordingly, the productivity is improved.

(4) In the method for controlling the recording system 11, the maintenance is executed in response to termination of the recording on the last one of the media included in targets of a process when the post-processing interval time T3 which is an interval of the post-processing is shorter than the predetermined maintenance interval time which is an interval of execution of the maintenance. Accordingly, the post-processing may be performed every time a set target number of media 12 are stacked on the intermediate stacker 32, and in addition, the post-processing may be performed utilizing the blank time of the recording operation caused by the maintenance. Furthermore, deterioration of an ejection state of the liquid ejection head 25 caused by delay of the maintenance may be suppressed.

(5) In the method for controlling the recording system 11, the maintenance is executed in response to termination of the recording on the last one of the media included in targets of a process when the post-processing interval time T3 which is an interval of the post-processing performed by the medium processing apparatus 31 is shorter than the predetermined maintenance interval time which is an interval of execution of the maintenance. Accordingly, the post-processing may be performed at an appropriate timing every time a set target number of media 12 are stacked on the intermediate stacker 32, and in addition, the process may be performed utilizing the blank time of the recording operation caused by the maintenance. In addition, when the maintenance is the flushing FL, for example, the flushing FL is performed with the second flushing interval time TI2 which is shorter than the predetermined first flushing interval time TIE Accordingly, deterioration of the ejection state of the liquid ejection head 25 due to a delay of the flushing FL may be suppressed. Note that the same effect is attained when the cleaning CL is performed as the maintenance instead of the flushing FL.

(6) In the method for controlling the recording system 11, when the maintenance is executed after the recording on the last media is terminated, light flushing in which the liquid ejection head 25 ejects a smaller amount of liquid when compared with a case where the flushing is performed with the first flushing interval time TI1 in the normal mode. Furthermore, when the maintenance is the cleaning CL, for example, the light cleaning in which the liquid ejection head 25 discharges a smaller amount of liquid when compared with the case where the cleaning CL is executed with the first cleaning interval time in the normal mode is executed. Accordingly, an amount of consumed liquid may be reduced while the maintenance is appropriately performed.

(7) In the method for controlling the recording system 11, the flushing FL is executed in accordance with the first flushing interval time TI1 when the post-processing interval time T3 for the post-processing performed by the medium processing apparatus 31 is longer than the predetermined first flushing interval time TI1 which is an interval for executing the flushing FL as the maintenance. Furthermore, when the maintenance is the cleaning CL, the cleaning CL is executed in accordance with the first cleaning interval time when the post-processing time T2 is longer than the predetermined first cleaning interval time which is an interval for executing the cleaning CL. Accordingly, deterioration of an ejection state of the liquid ejection head 25 may be suppressed.

(8) In the method for controlling the recording system 11, preliminary ejection of discharging liquid which does not relate to recording from the liquid ejection head 25 is executed as the maintenance performed by the maintenance apparatus 61. Accordingly, deterioration of an ejection state of the liquid ejection head 25 may be suppressed.

(9) In the method for controlling the recording system 11, the cleaning CL which is an operation of forcibly discharging liquid from the liquid ejection head 25 is performed as the maintenance performed by the maintenance apparatus 61. Accordingly, deterioration of an ejection state of the liquid ejection head 25 may be suppressed.

(10) The medium processing apparatus 31 includes the intermediate stacker 32 on which the media 12 recorded by the recording apparatus 13 are stacked, the processor which executes a process on the media 12 received by the intermediate stacker 32, and the second controller 120 which controls an operation of the processor. The second controller 120 executes the process after the medium 12 which is last recorded before the maintenance is stacked on the intermediate stacker 32. Accordingly, in the first mode, the post-processing apparatus 14 may perform the process utilizing the blank time in which the medium 12 is not transported since the maintenance is performed on the recording apparatus 13, and therefore, the productivity is improved. Consequently, the productivity is improved when compared with the general configuration in which the maintenance and the process are simultaneously performed.

(11) The recording system 11 includes the recording apparatus 13 and the medium processing apparatus 31. The recording apparatus 13 includes the liquid ejection head 25, the maintenance apparatus 61, and the first controller 110 which control the operation of the maintenance apparatus 61. The medium processing apparatus 31 includes the intermediate stacker 32 and the processor which executes the process on the media 12 received by the intermediate stacker 32. In the method for controlling the recording system 11, the first controller 110 executes the maintenance in response to termination of the recording on the last one of the media included in targets of a process when the post-processing interval time T3 which is an interval of the post-processing performed by the medium processing apparatus 110 is shorter than the predetermined maintenance interval time which is an interval of execution of the maintenance. According to the recording system 11, the effect of (10) is also attained.

Note that the foregoing embodiment may be changed to modifications below. Furthermore, appropriate combinations of the foregoing embodiment and the modifications below may be further modifications or appropriate combinations of the modifications below may be further modifications.

A determination as to whether the second mode is to be set is made by comparing the post-processing interval time T3 which is an interval for performing the post-processing with the predetermined maintenance interval time which is an interval for performing the maintenance. Alternatively, a determination as to whether the second mode is to be set may be made by comparing a period of time obtained by subtracting the period of time in which the maintenance operation is performed from a sum of the post-processing time T2 and the post-processing interval time T3 with the predetermined maintenance interval time.

Although light maintenance in which a smaller amount of liquid is discharged when compared with normal maintenance performed in the normal mode is performed in the second mode, the normal maintenance may be performed. In this case, only the flushing FL may be normally performed in the flushing FL and the cleaning CL in the second mode or only the cleaning CL may be normally performed in the second mode.

The aligning operation may be or may not be included in the post-processing. For example, the aligning operation performed when the number of media 12 stacked on the intermediate stacker 32 reaches the set number of media may be included in the post-processing. Furthermore, the aligning operation performed when the last one of the media 12 which are targets of the block discharge operation is received may be included in the post-processing.

Instead of the suction cleaning, pressure cleaning may be performed. Here, the pressure cleaning is performed such that liquid is forcibly pressurized and discharged from the nozzles 24 of the liquid ejection head 25 by pressurizing an ink pack, for example, serving as a liquid supply source by a pressure member or gas pressure.

It is assumed that the number of media stacked on the intermediate stacker 32 has not reached the number of media required to be discharged when a gap (blank) between the media 12 which becomes large since the media 12 on an upstream of the liquid ejection head 25 are not transported in the maintenance reaches the intermediate stacker 32. Even in this case, the media 12 may be discharged outside the intermediate stacker 32.

The first aligning mechanism 51 including the first aligning member 38 may be eliminated. With this configuration, the media 12 may be transported in the second direction Y2 using the first and second paddles 45 and 46 included in the supply mechanism 43 and the trailing ends 12*r* of the media 12 may abut on the medium abutting portions 47 so that the media 12 are aligned in the transport direction Y1.

The media 12 may be aligned in only one of the two directions in the aligning operation. For example, the media 12 received by the intermediate stacker 32 may be aligned only in the transport direction Y1 or only in the width direction X.

The maintenance may include, in addition to the preliminary ejection and the cleaning which are actually performed, a preparation operation performed before the preliminary ejection and the cleaning are actually executed after an end of recording.

The maintenance further includes a maintenance preparation operation of retracting the transfer belt from the transfer position to the retracting position and moving the maintenance mechanism from the retracting position to the head position. The maintenance further includes a recording preparation operation of moving the transfer belt from the retracting position to the transfer position and retracting the maintenance mechanism from the head position to the retracting position.

The wiping apparatus may be movable with the cap.

Only wiping may be performed in the maintenance without the flushing and the cleaning.

The alignment in the transport direction Y1 and the alignment in the width direction X are preferably performed every time the medium 12 is received in the intermediate stacker 32. However, the alignment in the transport direction Y1 and the alignment in the width direction X may be performed every time a plurality of media 12 are stacked.

The reception mechanism 41 which receives the media 12 in the intermediate stacker 32 may not include the movable guide 42 and the first puddles 45. For example, the reception mechanism 41 may be an absorbing transport belt which transports the medium 12 absorbed thereon. As an absorption method of the absorbing transfer belt, negative pressure, static electricity, or the like may be used. In this case, the absorbing transfer belt may receive the medium 12 by absorbing the medium 12 discharged from the transport mechanism 30 in the first transport direction Y0 toward an upper position of the intermediate stacker 32, transporting the medium 12 to the upper position of the intermediate stacker 32, and forcibly peeling off the medium 12 from the belt by cancelling the absorption or using a movable guide so as to drop off the medium 12 onto the stacking surface 32A. Alternatively, after the medium 12 absorbed on the absorbing transfer belt is transferred in the first transport direction Y0, a movement direction of the belt is reversed so that the medium 12 is transported in a switchback manner in the second transport direction which is opposite to the first transport direction Y0. Then the medium 12 is peeled off from the absorbing transfer belt while the medium 12 is transported in the second transport direction or the absorption of the medium 12 is cancelled so that the medium 12 is dropped on the stacking surface 32A. The stacking surface 32A may receive the medium 12 in this way.

The post-processing may be performed on a single medium 12 instead of the medium bundle 12B.

The maintenance may be performed once a plurality of times the post-processing is performed. Note that the flushing is preferably performed with a time interval smaller than the flushing interval time TI1 in the normal mode. Furthermore the cleaning is preferably performed with a time interval smaller than the cleaning interval time in the normal mode.

The recording apparatus 13 may be a serial printer instead of the line printer. The recording apparatus 13 in a serial printer records an image or the like on the medium 12 by discharging liquid from the nozzles 24 of the liquid ejection head 25 on the medium 12 intermittently transported in the first transport direction Y0 which intersects with the width direction X while the carriage including the liquid ejection head 25 reciprocates in the width direction X. When the maintenance time is reached during the recording operation, the carriage is moved to a home position set in an end of a movement path and discharges liquid from the nozzles 24 toward the cap of the maintenance apparatus disposed beneath the carriage located in the home position so that the flushing (the preliminary ejection) is performed. Furthermore, when a suction pump is driven in a state in which the cap is in contact with the liquid ejection head 25 in the home position so that negative pressure is generated in the cap, liquid is forcibly sucked and discharged from the nozzles 24 so that the cleaning is performed. The post-processing apparatus 14 which receives the recorded medium 12 from the serial type recording apparatus 13 directly or through the intermediate apparatus 15 includes the medium processing apparatus 31. In this way, the recording system 11 including the recording apparatus 13 and the medium processing apparatus 31 is configured. The medium processing apparatus 31 includes the intermediate stacker 32 (an example of a medium stacking section) and a processor. The processor executes the post-processing as an example of processing performed on the medium bundle 12B stacked on the intermediate stacker 32 after one of the media 12 which is last recorded before the maintenance is stacked on the intermediate stacker 32.

The intermediate apparatus 15 may be eliminated in the recording system 11. Specifically, the recording system 11 may include only the recording apparatus 13 and the post-processing apparatus 14. Furthermore, the reverse processing section 200 of the intermediate apparatus 15 may be incorporated in the post-processing apparatus 14. In this case, the post-processing apparatus 14 causes the intermediate stacker 32 to receive the medium 12 which is supplied from the recording apparatus 13 and reversed in the post-processing apparatus 14 before performing the post-processing. Furthermore, the reverse processing section 200 of the intermediate apparatus 15 may be incorporated in the recording apparatus 13. In this case, the post-processing apparatus 14 causes the intermediate stacker 32 to receive the medium 12 which has been transported from the recording apparatus 13 and reversed before performing the post-processing.

The medium processing apparatus may not be accommodated in the post-processing apparatus 14. A recording system including the recording apparatus 13 and the medium processing apparatus 31 which are accommodated in the same case may be employed. For example, the recording system may be configured by accommodating the medium processing apparatus 31 in the case of the recording apparatus 13. Furthermore, the recording system may be configured by accommodating the reverse processing section 200 and the medium processing apparatus 31 in the case of the recording apparatus 13. The medium processing apparatus 31 may be accommodated in the intermediate apparatus 15. In this way, the medium processing apparatus may be employed in all the recording apparatus, the post-processing apparatus, the intermediate apparatus, and the recording system.

The medium 12 is not limited to paper and may be a film or a sheet of synthetic resin, fabric, non-woven fabric, or a laminated sheet.

The recording apparatus 13 may be an ink jet type printing apparatus instead of the ink-jet type printer. Furthermore, the recording apparatus 13 may be a multifunction peripheral having a scanner function and a copy function, in addition to the print function.

Hereinafter, a technical scope recognized according to the foregoing embodiment and the modifications will be described with effects.

A method for controlling a medium processing apparatus including a medium stacking section on which media recorded by a recording apparatus are stacked, the recording apparatus including a liquid ejection head which performs recording by ejecting liquid to a medium and a maintenance section which executes maintenance of the liquid ejection head, and a processor which executes a process on the media received by the medium stacking section. The method includes executing the process after a medium which is last recorded before the maintenance is performed is stacked on the medium stacking section.

With this configuration, the post-processing apparatus may perform the process utilizing the blank time in which the medium is not transported since the maintenance is performed on the recording apparatus, and therefore, the productivity is improved. Furthermore, the transport of the medium which is last recorded before the maintenance may be continuously performed even during the maintenance. Accordingly, a temporal loss caused by a stop of the transport of the recorded media during the maintenance may be suppressed or reduced. Consequently, the productivity is improved when compared with the general configuration in which the maintenance and the process are simultaneously performed. Consequently, the process may be performed using the blank time in which the medium is not transported since the maintenance is performed, while stop of the transport of the recorded media during the maintenance is avoided.

A method for controlling a recording system including a recording apparatus including a liquid ejection head which performs recording by ejecting liquid to a medium and a maintenance section which executes maintenance of the liquid ejection head, and a medium processing apparatus including a medium stacking section on which media recorded by the recording apparatus are stacked, and a processor which executes a process on the media received by the medium stacking section. The method includes executing the process after a medium which is last recorded before the maintenance is performed is stacked on the medium stacking section.

With this configuration, the post-processing apparatus may perform the process utilizing the blank time in which the medium is not transported since the maintenance is performed on the recording apparatus, and therefore, the productivity is improved. Furthermore, the transport of the medium which is last recorded before the maintenance may be continuously performed even during the maintenance. Accordingly, a temporal loss caused by a stop of the transport of the recorded media during the maintenance may be suppressed or reduced. Consequently, the productivity is improved when compared with the general configuration in which the maintenance and the process are simultaneously performed. Accordingly, inconvenience in productivity caused by the stop of the transport of the recorded media during the maintenance may be avoided.

In the method for controlling the recording system, the maintenance may be started before the medium which is last recorded before the maintenance is performed reaches the medium stacking section.

With this configuration, the blank time in which the medium is not transported to the post-processing apparatus since the recording operation is temporarily stopped due to the maintenance may be reduced, and accordingly, the productivity is improved.

In the method for controlling the recording system, the maintenance may be executed in response to termination of the recording on media included in targets of the process of one time when a processing interval time which is an interval of the process is shorter than a predetermined maintenance interval time which is an interval of execution of the maintenance.

With this configuration, the process may be performed at an appropriate timing every time a set target number of media are stacked on the intermediate stacker, and in addition, the process may be performed utilizing the blank time of the recording operation caused by the maintenance. In addition, the maintenance is performed with an interval time which is shorter than the predetermined maintenance interval time. Accordingly, deterioration of the ejection state of the liquid ejection head due to a delay of the maintenance may be suppressed.

A method for controlling a recording system includes a recording apparatus including a liquid ejection head which performs recording by ejecting liquid to a medium and a maintenance section which performs maintenance of the liquid ejection head and a medium processing apparatus including a medium stacking section on which media recorded by the recording apparatus are stacked, and a processor which executes a process on the media received by the medium stacking section. The method includes executing the maintenance in response to termination of the recording on media included in targets of the process of one time when a processing interval time which is an interval of the process is shorter than a predetermined maintenance interval time which is an interval of execution of the maintenance.

With this configuration, the process may be performed at an appropriate timing every time a set target number of media are stacked on the intermediate stacker, and in addition, the process may be performed utilizing the blank time of the recording operation caused by the maintenance. Furthermore, deterioration of an ejection state of the liquid ejection head caused by delay of the maintenance may be suppressed.

In the method for controlling the recording system, when the maintenance is executed after the recording on the media are terminated, light maintenance in which the liquid ejection head ejects a smaller amount of liquid when compared with a case where the maintenance is executed with the maintenance interval time may be executed.

With this configuration, consumption of the liquid may be suppressed while the maintenance is appropriately performed.

In the method for controlling the recording system, the maintenance may be executed in accordance with the maintenance interval time when the processing interval time which is the interval of the process is longer than the predetermined maintenance interval time which is the interval of execution of the maintenance.

With this configuration, deterioration of an ejection state of the liquid ejection head may be suppressed.

In the method for controlling the recording system, as the maintenance performed by the maintenance section, preliminary ejection of ejecting liquid which does not relate to the recording from the liquid ejection head may be executed.

With this configuration, deterioration of an ejection state of the liquid ejection head may be suppressed.

In the method for controlling the recording system, as the maintenance performed by the maintenance section, cleaning for forcibly discharging liquid from the liquid ejection head may be executed.

With this configuration, deterioration of an ejection state of the liquid ejection head may be suppressed.

A post-processing apparatus includes a medium stacking section on which media recorded by a recording apparatus are stacked, the recording apparatus including a liquid ejection head which performs recording by ejecting liquid to a medium and a maintenance section which executes maintenance of the liquid ejection head, a processor configured to execute a process on the media received by the medium stacking section, and a controller configured to control operation of the processor. The controller executes the process after a medium which is last recorded before the maintenance is performed is stacked on the medium stacking section.

With this configuration, a blank time in which the medium processing apparatus may not perform processing since the maintenance is performed on the recording apparatus and a blank time in which the recording apparatus may not perform recording since the medium processing apparatus performs a process may be effectively utilized. For example, even if a long period of time is required for the recorded medium to reach the medium stacking section, the process may be executed on the media stacked on the medium stacking section effectively utilizing the blank time of the recording operation caused by the maintenance. Consequently, the productivity is improved when compared with the case where the maintenance and the process are simultaneously performed.

A recording system includes a recording apparatus including a liquid ejection head which performs recording by ejecting liquid to a medium, a maintenance section which performs maintenance of the liquid ejection head, and a controller which controls operations of the maintenance section, and a medium processing apparatus including a medium stacking section on which media recorded by the recording apparatus are stacked and a processor which executes a process on the media received by the medium stacking section. The controller executes the maintenance in response to termination of the recording performed on media included in targets of the process of one time when a processing interval time which is an interval of the process is shorter than a predetermined maintenance interval time which is an interval of execution of the maintenance.

With this configuration, a blank time in which the medium processing apparatus may not perform processing since the maintenance is performed on the recording apparatus and a blank time in which the recording apparatus may not perform recording since the medium processing apparatus performs a process may be effectively utilized. For example, even if a long period of time is required for the recorded medium to reach the medium stacking section, the process may be executed on the media stacked on the medium stacking section effectively utilizing the blank time of the recording operation caused by the maintenance. Consequently, the productivity is improved when compared with the case where the maintenance and the process are simultaneously performed.

What is claimed is:

1. A method for controlling a recording system including
- a recording apparatus including a liquid ejection head which performs recording by ejecting liquid to a medium,
- a maintenance section which executes maintenance of the liquid ejection head, and
- a medium processing apparatus that includes
- a medium stacking section on which media recorded by the recording apparatus are stacked, and
- a processor which executes a post-process on the media received by the medium stacking section, the method comprising:
- when a processing interval time which is an interval between a first post-process and a second post-process consecutive after the first post-process is shorter than a predetermined maintenance interval time which is an interval of timings of execution of the predetermined maintenance, executing the maintenance in response to termination of the recording on media included in targets of the first post-process not at the timing of execution of the predetermined maintenance.

2. The method for controlling the recording system according to claim 1, wherein When the maintenance is executed after the recording on the media are terminated, light maintenance in which the liquid ejection head ejects a smaller amount of liquid when compared with a case where the maintenance is executed with the predetermined maintenance interval time is executed.

3. The method for controlling the recording system according to claim 1, wherein the maintenance is executed in accordance with the predetermined maintenance interval time when the processing interval time is longer than the predetermined maintenance interval time.

4. The method for controlling the recording system according to claim 3, further comprising determining whether the processing interval time is shorter than the predetermined maintenance interval time.

5. The method for controlling the recording system according to claim 1, wherein as the maintenance performed by the maintenance section, preliminary ejection of ejecting liquid which does not relate to the recording from the liquid ejection head is executed.

6. The method for controlling the recording system according to claim 1, wherein as the maintenance performed by the maintenance section, cleaning for forcibly discharging liquid from the liquid ejection head is executed.

7. A recording system comprising:

a recording apparatus including a liquid ejection head which performs recording by ejecting liquid to a medium, a maintenance section which executes maintenance of the liquid ejection head, and a controller which controls operations of the maintenance section; and a medium processing apparatus including a medium stacking section on which media recorded by the recording apparatus are stacked, and a processor which executes a post-process on the media received by the medium stacking section, wherein the controller, when a processing interval time which is an interval between a first post-process and a second post-process consecutive after the first post-process is shorter than a predetermined maintenance interval time which is an interval of timings of execution of the predetermined maintenance, executes the maintenance in response to termination of the recording on media included in targets of the first post-process not at the timing of execution of the predetermined maintenance.

8. A method for controlling a recording system including a recording apparatus including a liquid ejection head which performs recording by ejecting liquid to a medium, a maintenance section which executes maintenance of the liquid ejection head, and a medium processing apparatus that includes a medium stacking section on which media recorded by the recording apparatus are stacked, and a processor which executes a post-process on the media received by the medium stacking section, the method comprising:

when a processing interval time which is an interval between a first post-process and a second post-process consecutive after the first post-process is shorter than a predetermined maintenance interval time which is an interval between two consecutive predetermined maintenance in a normal mode, executing the maintenance in response to termination of the recording on media included in targets of the first post-process.

* * * * *